US010171800B2

United States Patent
Sugimoto

(10) Patent No.: US 10,171,800 B2
(45) Date of Patent: Jan. 1, 2019

(54) INPUT/OUTPUT DEVICE, INPUT/OUTPUT PROGRAM, AND INPUT/OUTPUT METHOD THAT PROVIDE VISUAL RECOGNITION OF OBJECT TO ADD A SENSE OF DISTANCE

(71) Applicant: BRILLIANTSERVICE CO., LTD, Kita-ku, Osaka-shi, Osaka (JP)

(72) Inventor: Yoshihiko Sugimoto, Osaka (JP)

(73) Assignee: MIRAMA SERVICE INC., New Castle, DE (US)

( * ) Notice: Subject to any disclaimer, the term of this patent is extended or adjusted under 35 U.S.C. 154(b) by 243 days.

(21) Appl. No.: 14/768,238

(22) PCT Filed: Feb. 19, 2013

(86) PCT No.: PCT/JP2013/000910
§ 371 (c)(1),
(2) Date: Aug. 17, 2015

(87) PCT Pub. No.: WO2014/128750
PCT Pub. Date: Aug. 28, 2014

(65) Prior Publication Data
US 2015/0381970 A1    Dec. 31, 2015

(51) Int. Cl.
*H04N 13/344*    (2018.01)
*H04N 13/371*    (2018.01)
(Continued)

(52) U.S. Cl.
CPC ........... *H04N 13/344* (2018.05); *G06F 1/163* (2013.01); *G06F 3/017* (2013.01); *G06F 3/0304* (2013.01);
(Continued)

(58) Field of Classification Search
CPC ........ G06F 1/163; G06F 3/017; G06F 3/0304; G06F 3/0482; G06F 3/04842;
(Continued)

(56) References Cited

U.S. PATENT DOCUMENTS 9,310,891 B2 *   4/2016   Rafii ................... G06F 3/017
2004/0066555 A1   4/2004   Nomura
(Continued)

FOREIGN PATENT DOCUMENTS

| JP | 08-31140 | 3/1996 |
| JP | 2004-126902 | 4/2004 |

(Continued)

OTHER PUBLICATIONS

International Preliminary Report on Patentability for International Patent Application No. PCT/JP2013/000910 dated Aug. 25, 2015, 6 pages.
(Continued)

*Primary Examiner* — Francis Geroleo
(74) *Attorney, Agent, or Firm* — Amin, Turocy & Watson LLP

(57) ABSTRACT

An I/O device, an I/O program, and an I/O method that can add a sense of distance from the position of visually recognizing eyes to a stereoscopic image that is a virtual image, through an object that is a real image and provide visual recognition as if the stereoscopic image were associated with the object are provided. An I/O device of the present invention includes a display device that can generate a stereoscopic image, a depth level sensor that measures a distance to an object, and an event generating unit that generates an event according to a mode of the object at least either in a stereoscopic region of the stereoscopic image generated by the display device or in a depth level detection region of the depth level sensor.

10 Claims, 33 Drawing Sheets

(51) Int. Cl.
*G06F 1/16* (2006.01)
*G06F 3/01* (2006.01)
*G06F 3/03* (2006.01)
*G06F 3/0482* (2013.01)
*G06F 3/0484* (2013.01)
*G06F 3/0488* (2013.01)
*H04N 13/254* (2018.01)
*H04N 13/239* (2018.01)

(52) U.S. Cl.
CPC ........ *G06F 3/0482* (2013.01); *G06F 3/04842* (2013.01); *G06F 3/04845* (2013.01); *G06F 3/04883* (2013.01); *H04N 13/239* (2018.05); *H04N 13/254* (2018.05); *H04N 13/371* (2018.05)

(58) Field of Classification Search
CPC ............ G06F 3/04845; G06F 3/04883; H04N 13/0239; H04N 13/0253; H04N 13/044; H04N 13/0472
USPC .......................................................... 348/53
See application file for complete search history.

(56) References Cited

U.S. PATENT DOCUMENTS

| | | | | |
|---|---|---|---|---|
| 2008/0120577 A1* | 5/2008 | Ma | ........................ | G06F 3/017 715/863 |
| 2011/0083106 A1 | 4/2011 | Hamagishi | | |
| 2011/0140994 A1 | 6/2011 | Noma | | |
| 2012/0121185 A1* | 5/2012 | Zavesky | ................. | G06F 3/005 382/195 |
| 2012/0223882 A1* | 9/2012 | Galor | ..................... | G06F 3/017 345/157 |
| 2013/0321462 A1* | 12/2013 | Salter | ..................... | G06F 1/163 345/633 |
| 2014/0062854 A1* | 3/2014 | Cho | ........................ | G06F 3/017 345/156 |
| 2014/0204002 A1* | 7/2014 | Bennet | ................... | G06F 3/011 345/8 |
| 2014/0225918 A1* | 8/2014 | Mittal | ..................... | G06F 3/017 345/633 |

FOREIGN PATENT DOCUMENTS

| | | |
|---|---|---|
| JP | 2011-081480 | 4/2011 |
| JP | 2011-128220 | 6/2011 |
| JP | 2012-022458 | 2/2012 |
| JP | 2012-106005 | 6/2012 |
| JP | 2012-521039 | 9/2012 |
| JP | 2012-528405 | 11/2012 |
| JP | 2012-533120 | 12/2012 |
| JP | 2013-021389 | 1/2013 |
| WO | 2010-107577 | 9/2010 |
| WO | 2010-138743 | 12/2010 |
| WO | 2011-005784 | 1/2011 |

OTHER PUBLICATIONS

International Search Report for International Patent Application No. PCT/JP2013/000910 dated Apr. 23, 2013, 4 pages.

* cited by examiner

INPUT/OUTPUT DEVICE, INPUT/OUTPUT PROGRAM, AND INPUT/OUTPUT METHOD THAT PROVIDE VISUAL RECOGNITION OF OBJECT TO ADD A SENSE OF DISTANCE

TECHNICAL FIELD

The present invention relates to an I/O device, an I/O program, and an I/O method. More specifically, the present invention relates to an I/O device, an I/O program, and an I/O method that provide visual recognition as if a stereoscopic image were associated with an object.

BACKGROUND ART

Japanese Patent Publication No. 8-31140 (Patent Literature 1) discloses computer graphics, that is, a high-speed image generation/display method in which a vivid and realistic image is displayed on a screen at a high speed.

The high-speed image generation/display method according to Patent Literature 1 is a high-speed image generation/display method in which a target having a three-dimensional structure is projected and displayed on a two-dimensional screen. In this method, a constituent surface of the target is hierarchically described with the region size being defined as at least one element, in a target coordinate system. Then, when the constituent surface of the target taken from an arbitrary point of view is projected on the two-dimensional screen, the hierarchy level is set with the distance from the origin of a display reference coordinate system or the point of view to an arbitrary point of the target represented in the target coordinate system being defined as at least one parameter.

Japanese Patent Laid-Open No. 2004-126902 (Patent Literature 2) discloses a stereoscopic image generation method and a stereoscopic image generation device that efficiently generate a stereoscopic image with no load on an observer.

In the stereoscopic image generation method according to Patent Literature 2, object data to be planarly displayed, of objects each formed by a polygon having three-dimensional coordinates, is converted into reference camera coordinate system data whose origin is a reference camera, and object data to be stereoscopically displayed, of the objects, is converted into pieces of right-eye and left-eye parallax camera coordinate system data whose origins are respectively right-eye and left-eye parallax cameras having a predetermined parallactic angle therebetween. Then, the object data in the reference camera coordinate system and the object data in the right-eye parallax camera coordinate system are drawn as right-eye image data in a video memory, and the object data in the reference camera coordinate system and the object data in the left-eye parallax camera coordinate system are drawn as left-eye image data in the video memory. Then, the right-eye image data and the left-eye image data drawn in the video memory are composited with each other, and an image mixedly including the stereoscopic object and the planar object is displayed on a stereoscopic display device.

National Publication of International Patent Application No. 2012-533120 (Patent Literature 3) discloses a method using face recognition and gesture/body posture recognition techniques.

The method according to Patent Literature 3 is a method for applying attributes indicative of a user's temperament to a visual representation, the method including: rendering the visual representation of a user; receiving data of a physical space, the data being representative of the user in the physical space; analyzing at least one detectable characteristic to deduct the user's temperament; and applying the attributes indicative of the user's temperament to the visual representation.

National Publication of International Patent Application No. 2012-528405 (Patent Literature 4) discloses a system and a method of supplying multi-mode input to a space or gesture calculation system.

The system according to Patent Literature 4 is a system including: an input device; and a detector that is coupled to a processor and detects an orientation of the input device. The input device has a plurality of mode orientations corresponding to the orientation. The plurality of mode orientations correspond to a plurality of input modes of a gesture control system. The detector is coupled to the gesture control system, and automatically controls selection of an input mode of the plurality of input modes in response to the orientation.

National Publication of International Patent Application No. 2012-521039 (Patent Literature 5) discloses a system, a method, and a computer-readable medium for manipulating a virtual object. The method according to Patent Literature 5 is a method of manipulating a virtual object in a virtual space, including: determining at least one controller that a user utilizes to manipulate the virtual object; mapping the controller to a cursor in the virtual space; determining controller input indicative of the user manipulating the virtual object with the cursor; and displaying a result of the manipulation.

Japanese Patent Laid-Open No. 2012-106005 (Patent Literature 6) discloses an image display device, a game program, and a game control method that enables an observer of the image display device to feel as if the observer could directly manipulate an actually non-existing stereoscopic image. The image display device according to Patent Literature 6 includes: image display means for displaying a parallax image on a display screen; first coordinate calculation means for calculating virtual space coordinates of a stereoscopic image that the observer of the parallax image recognizes between the display screen and the observer; second coordinate calculation means for calculating space coordinates of a manipulation object as a manipulation target of the observer; and event generation means for generating a predetermined event that changes at least one of the parallax image and an image on the display screen other than the parallax image, when a distance between the space coordinates of at least one point of the stereoscopic image calculated by the first coordinate calculation means and the space coordinates of at least one point of the manipulation object calculated by the second coordinate calculation means is equal to or less than a predetermined threshold.

CITATION LIST

Patent Literature

Patent Literature 1: Japanese Patent Publication No. 8-31140
Patent Literature 2: Japanese Patent Laid-Open No. 2004-126902
Patent Literature 3: National Publication of International Patent Application No. 2012-533120
Patent Literature 4: National Publication of International Patent Application No. 2012-528405
Patent Literature 5: National Publication of International Patent Application No. 2012-521039

Patent Literature 6: Japanese Patent Laid-Open No. 2012-106005

SUMMARY OF INVENTION

Technical Problem

The object of the present invention is to provide an I/O device, an I/O program, and an I/O method that can add a sense of distance from the position of visually recognizing eyes to a stereoscopic image that is a virtual image, through an object that is a real image and provide visual recognition as if the stereoscopic image were associated with the object.

Solution to Problem (1)
An I/O device according to one aspect includes a display device that can generate a stereoscopic image, a depth level sensor that measures a distance to an object, and an event generating unit that generates an event according to a mode of the object at least either in a stereoscopic region of the stereoscopic image generated by the display device or in a depth level detection region of the depth level sensor.

An I/O device according to the present invention includes a display device, a depth level sensor, and an event generating unit. The display device can generate a stereoscopic image. The depth level sensor measures a distance to an object. The event generating unit generates an event according to a mode of the object at least either in a stereoscopic region of the stereoscopic image generated by the display device or in a depth level detection region.

In this case, it is possible to add a sense of distance from the position of visually recognizing eyes to the stereoscopic image that is a virtual image through the object that is a real image and provide visual recognition as if the stereoscopic image were associated with the object.

The depth level refers to the distance from the depth level sensor to the object that is a detection target.

(2)
With regard to an I/O device according to a second invention, in the I/O device according to the one aspect, the event generating unit may include a shadow displaying unit that displays a shadow of the object in the depth level detection region.

In this case, it is possible to add higher reality to the visual recognition mode as if the stereoscopic image that is a virtual image were associated with the object that is a real image.

(3)
With regard to an I/O device according to a third invention, in the I/O device according to the second invention, the shadow displaying unit may include a shadow changing unit that changes the shadow of the object according to a motion of the object in a depth level direction.

In this case, the sense of distance between the stereoscopic image and the object can be easily grasped. For example, the sense of distance between the object and a common region of the stereoscopic region and the depth level detection region can be easily recognized by change in the shadow.

(4)
With regard to an I/O device according to a fourth invention, in the I/O device according to the one aspect to the third invention, the event generating unit may include a surrounding changing unit that changes a display surrounding the object in a common region of the stereoscopic region and the depth level detection region.

In this case, whether or not the object exists in the common region can be easily recognized. Furthermore, it is possible to provide visual recognition as if the stereoscopic image were controlled by the object.

(5)
With regard to an I/O device according to a fifth invention, in the I/O device according to the one aspect to the fourth invention, the event generating unit may include a notifying unit that gives notification that the object exists in the common region of the stereoscopic region and the depth level detection region or in the depth level detection region.

In this case, due to the notifying unit, that the object exists in the common region of the stereoscopic region and the depth level detection region or in the depth level detection region can be easily recognized.

(6)
With regard to an I/O device according to a sixth invention, in the I/O device according to the one aspect to the fifth invention, the display device may be a head-mounted display.

In this case, the I/O device is achieved in a small-sized and attachable mode, for example, in the form of glasses so that the I/O device can be easily carried. Since the head-mounted display is small, the versatility and convenience can be enhanced.

(7)
An I/O program according to another aspect includes a display process of generating a stereoscopic image, a depth level sensor process of measuring a distance to an object, and an event generation process of generating an event according to a mode of the object at least either in a stereoscopic region of the stereoscopic image generated in the display process or in a depth level detection region in the depth level sensor process.

An I/O program according to the present invention includes a display process, a depth level sensor process, a common region process, and an event generation process. In the display process, a stereoscopic image is generated. In the depth level sensor process, a distance to an object is measured. In the event generation process, an event is generated according to a mode of the object at least either in a stereoscopic region of the stereoscopic image generated in the display process or in a depth level detection region in the depth level sensor process.

In this case, it is possible to add a sense of distance from the position of visually recognizing eyes to the stereoscopic image that is a virtual image, through the object that is a real image and provide visual recognition as if the stereoscopic image were associated with the object.

The depth level refers to the distance from the depth level sensor to the object that is a detection target.

(8)
With regard to an I/O program according to an eighth invention, in the I/O program according to the other aspect, the event generation process may include a shadow display process of displaying a shadow of the object in the depth level detection region.

In this case, it is possible to add higher reality to the visual recognition mode as if the stereoscopic image that is a virtual image were associated with the object that is a real image.

(9)
With regard to an I/O program according to a ninth invention, in the I/O program according to the eighth invention, the shadow display process may include a shadow change process of changing the shadow of the object according to a motion of the object in a depth level direction.

In this case, the sense of distance between the stereoscopic image and the object can be easily grasped. For example, the sense of distance between the object and a common region of the stereoscopic region and the depth level detection region can be easily recognized by change in the shadow.

(10)

With regard to an I/O program according to a tenth invention, in the I/O program according to the other aspect to the ninth invention, the event generation process may include a surrounding change process of changing display surrounding the object in a common region of the stereoscopic region and the depth level detection region.

In this case, whether or not the object exists in the common region can be easily recognized. Furthermore, it is possible to provide visual recognition as if the stereoscopic image were controlled by the object.

(11)

With regard to an I/O program according to an eleventh invention, in the I/O program according to the other aspect to the tenth invention, the event generation process may include a notification process of giving notification that the object exists in the common region of the stereoscopic region and the depth level detection region or in the depth level detection region.

In this case, due to a notifying unit, that the object exists in the common region of the stereoscopic region and the depth level detection region or in the depth level detection region can be easily recognized.

(12)

An I/O method according to still another aspect includes a display step of generating a stereoscopic image, a depth level sensor step of measuring a distance to an object, and an event generation step of generating an event according to a mode of the object at least either in a stereoscopic region of the stereoscopic image generated in the display step or in a depth level detection region in a depth level sensor program.

An I/O method according to the present invention includes a display step, a depth level sensor step, a common region step, and an event generation step. In the display step, a stereoscopic image is generated. In the depth level sensor step, a distance to an object is measured. In the event generation step, an event is generated according to a mode of the object at least either in a stereoscopic region of the stereoscopic image generated in the display step or in a depth level detection region in the depth level sensor step.

In this case, it is possible to add a sense of distance from the position of visually recognizing eyes to the stereoscopic image that is a virtual image, through the object that is a real image and provide visual recognition as if the stereoscopic image were associated with the object.

The depth level refers to the distance from the depth level sensor to the object that is a detection target.

(13)

With regard to an I/O method according to a thirteenth invention, in the I/O method according to the still another aspect, the event generation step may include a shadow display step of displaying a shadow of the object in the depth level detection region.

In this case, it is possible to add higher reality to the visual recognition mode as if the stereoscopic image that is a virtual image were associated with the object that is a real image.

(14)

With regard to an I/O method according to a fourteenth invention, in the I/O method according to the thirteenth invention, the shadow display step may include a shadow change step of changing the shadow of the object according to a motion of the object in a depth level direction.

In this case, the sense of distance between the stereoscopic image and the object can be easily grasped. For example, the sense of distance between the object and a common region of the stereoscopic region and the depth level detection region can be easily recognized by change in the shadow.

(15)

With regard to an I/O method according to a fifteenth invention, in the I/O method according to the still another aspect to the fourteenth invention, the event generation step may include a surrounding change step of changing display surrounding the object in the common region of the stereoscopic region and the depth level detection region.

In this case, whether or not the object exists in the common region can be easily recognized. Furthermore, it is possible to provide visual recognition as if the stereoscopic image were controlled by the object.

(16)

With regard to an I/O method according to a sixteenth invention, in the I/O method according to the still another aspect to the fifteenth invention, the event generation step may include a notification step of giving notification that the object exists in the common region of the stereoscopic region and the depth level detection region or in the depth level detection region.

In this case, due to a notifying unit, that the object exists in the common region of the stereoscopic region and the depth level detection region or in the depth level detection region can be easily recognized.

Advantageous Effects of Invention

The present invention can provide an I/O device, an I/O program, and an I/O method that can add a sense of distance from the position of visually recognizing eyes to a stereoscopic image that is a virtual image, through an object that is a real image and provide visual recognition as if the stereoscopic image were associated with the object.

Figure 1:
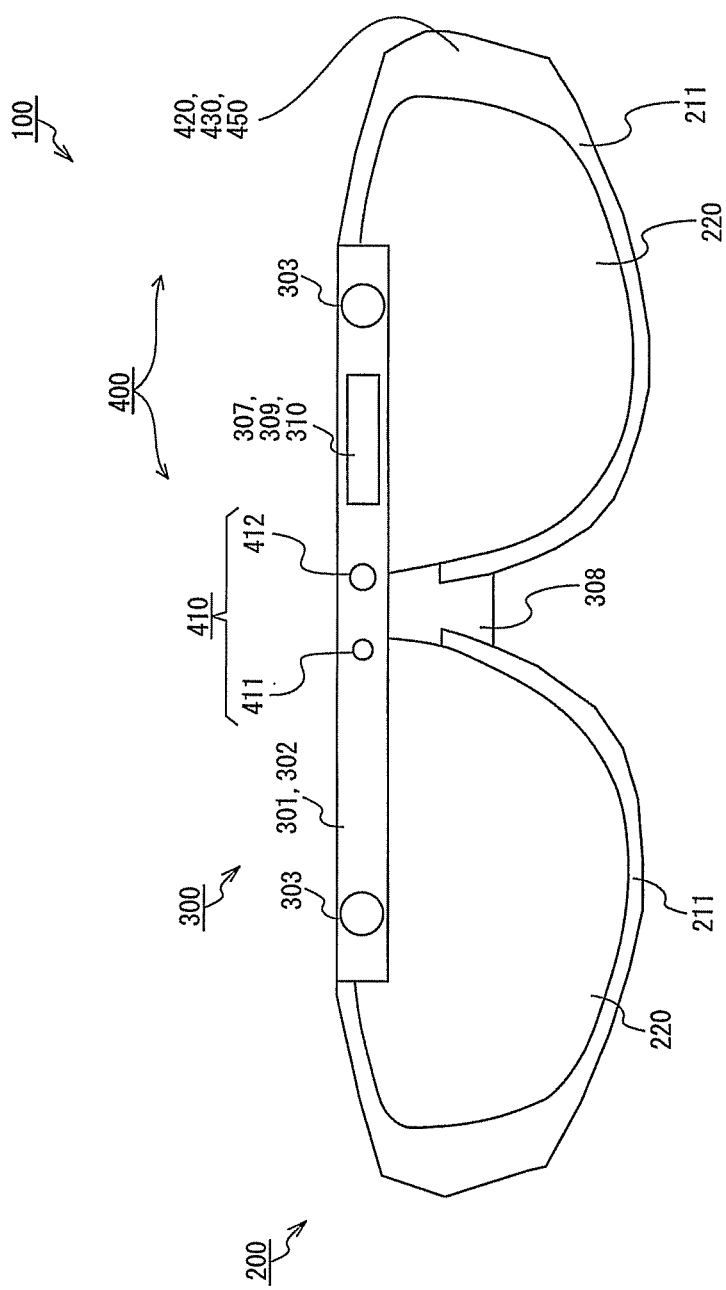
FIG. 1 is a schematic external front view illustrating an example of a basic configuration of a glasses display device 100 according to an embodiment.

REFERENCE SIGNS LIST 100 glasses display device
220 semi-transmissive display
221 advertisement
2203D virtual image display region (common region)
300 communication system
303 camera unit
410 infrared ray detection unit
410c manipulation region
420 gyroscope unit
430 acceleration detection unit
4103D three-dimensional space detection region
450 control unit
454 anatomy recognition unit
456 gesture recognition unit
460 event service unit
461 calibration service unit
701 to 707 view
900 I/O device
H1 hand
H2, H3 shadow
RP right shoulder joint
LP left shoulder joint
OF outer shape
$p_n$, $p_0$, $p_1$ vertex
$PP_1$ reference line segment
$pp_2$ side
$pp_k$ side
P0 tip point
P1 base point
C maximum inscribed circle
V3 face recognition application screen
V5 SNS application screen

DESCRIPTION OF EMBODIMENT

Hereinafter, an embodiment of the present invention is described with reference to the drawings. In the following description, the same reference signs are given to the same components. The names and functions thereof are the same. Accordingly, detailed description thereof is not repeated.

Moreover, the present invention is not limitatively applied to the following glasses display device, and can also be applied to other I/O devices, display devices, televisions, monitors, projectors, and the like.

(Configuration Outline of Glasses Display Device)

Figure 2:
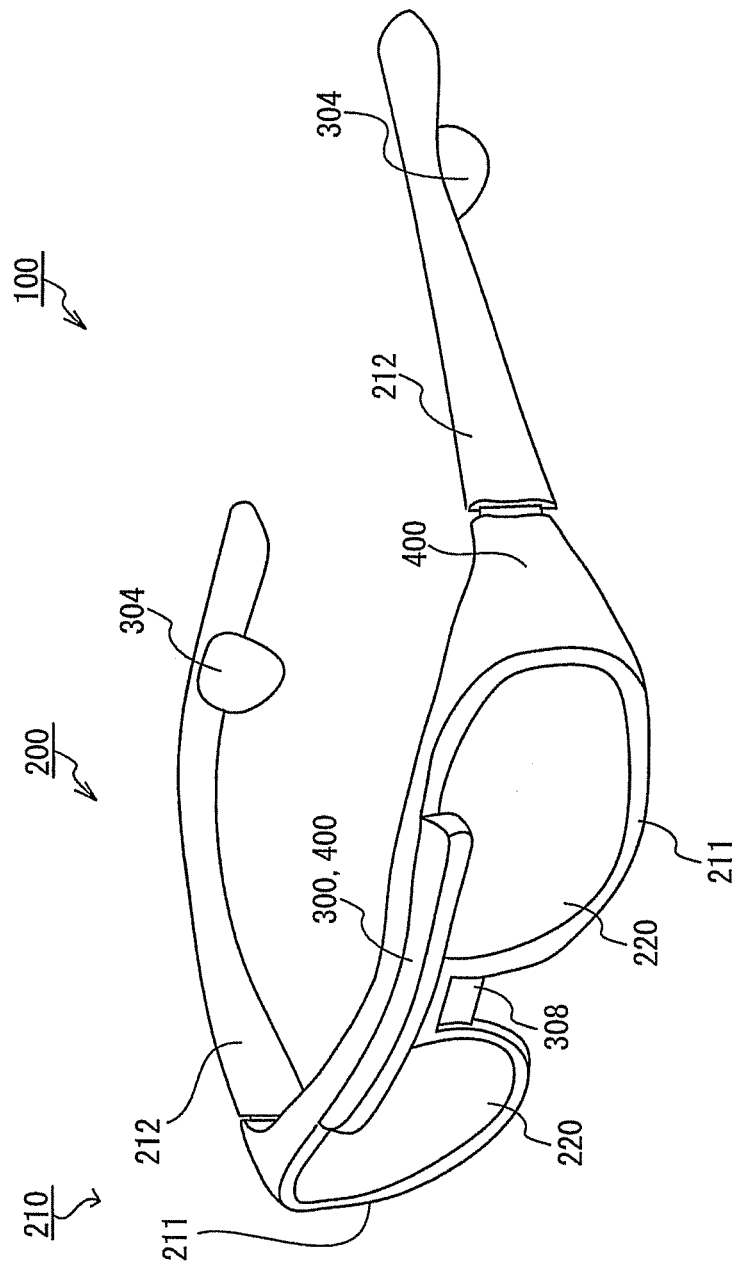
FIG. 2 is a schematic external perspective view illustrating an example of the glasses display device 100.

FIG. 1 is a schematic external front view illustrating an example of a basic configuration of a glasses display device 100 according to an embodiment, and FIG. 2 is a schematic external perspective view illustrating an example of the glasses display device 100.

As illustrated in FIG. 1 or FIG. 2, the glasses display device 100 is a glasses-shaped display device. As described later, the glasses display device 100 is used while being attached to the face of a user.

As illustrated in FIG. 1 and FIG. 2, the glasses display device 100 mainly includes a glasses unit 200, a communication system 300, and an operation system 400.

(Glasses Unit 200)

As illustrated in FIG. 1 and FIG. 2, the glasses unit 200 includes a glasses frame 210 and a pair of semi-transmissive displays 220. The glasses frame 210 mainly includes a rim unit 211 and a temple unit 212.

The pair of semi-transmissive displays 220 is supported by the rim unit 211 of the glasses frame 210.

In the present embodiment, the rim unit 211 of the glasses display device 100 is provided with the pair of semi-transmissive displays 220. Not limited thereto, the rim unit 211 of the glasses display device 100 may be provided with lenses such as normal sunglasses lenses, ultraviolet protection lenses, or glasses lenses, and one semi-transmissive display 220 or the pair of semi-transmissive displays 220 may be separately provided.

Alternatively, the semi-transmissive display(s) 220 may be provided so as to be embedded in part of the lenses.

Further, the present embodiment is not limited to such a glasses type, and can be applied to a hat type and other arbitrary head-mounted display devices as long as the device can be attached to the body of a person and can be arranged within the field of view of the person.

(Communication System 300)

Next, the communication system 300 is described.

The communication system 300 includes a battery unit 301, an antenna module 302, a camera unit 303, a speaker unit 304, a global positioning system (GPS) unit 307, a microphone unit 308, a subscriber identity module card (SIM) unit 309, and a main unit 310.

Note that the camera unit may be provided with a CCD sensor. The speaker unit 304 may be normal earphones, and may be bone-conduction earphones. The SIM unit 309 includes a near field communication (NFC) unit, another contact-type IC card unit, and a contactless IC card unit.

As described above, the communication system 300 according to the present embodiment at least has any of the functions of a mobile phone, a smartphone, and a tablet terminal. Specifically, the communication system 300 has a phone function, an Internet function, a browser function, an e-mail function, an image taking function, and the like.

Accordingly, with the use of the glasses display device 100, the user can use a phone call function similar to that of a mobile phone by means of the communication device, the speaker, and the microphone. Moreover, because the glasses display device 100 is glasses-shaped, the user can make a phone call without using both his/her hands.

(Operation System 400)

Next, the operation system 400 includes an infrared ray detection unit 410, a gyroscope unit 420, an acceleration detection unit 430, and a control unit 450. The infrared ray detection unit 410 mainly includes an infrared ray emission element 411 and an infrared ray detection camera 412.

Figure 3:
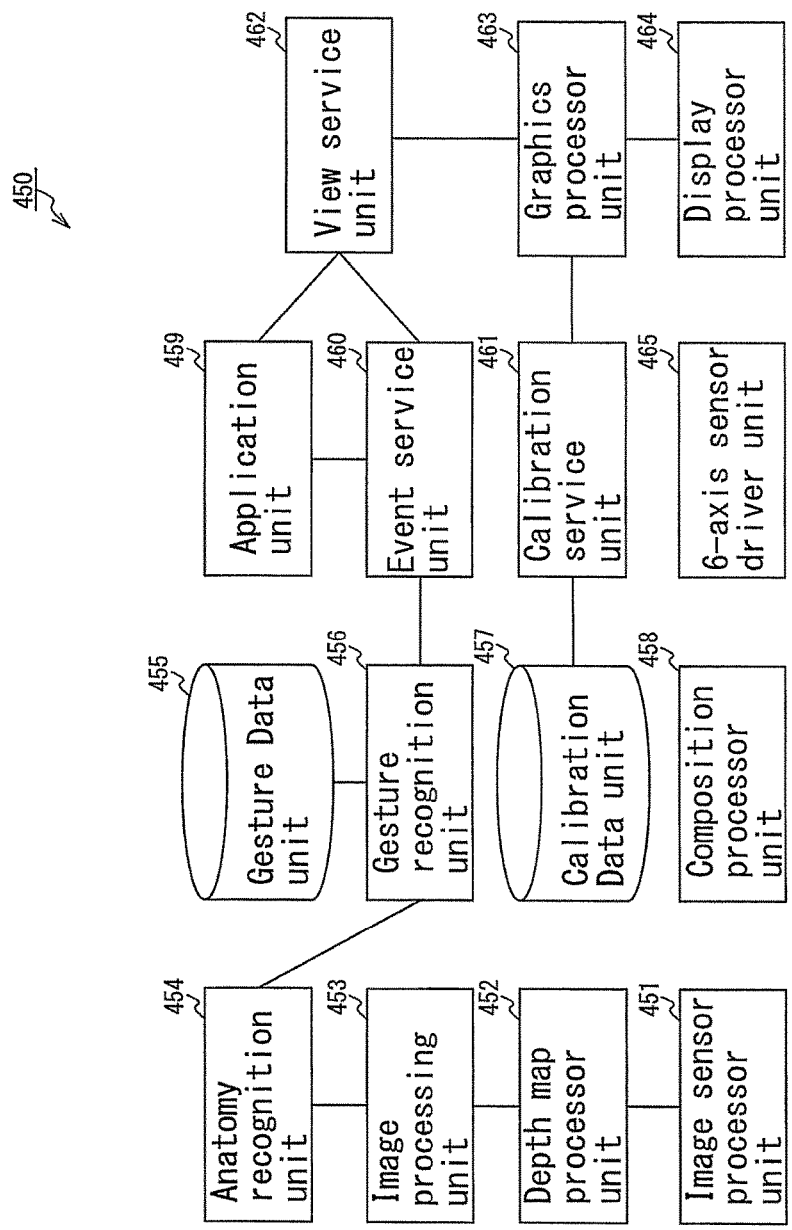
FIG. 3 is a schematic diagram illustrating an example of a configuration of a control unit 450 of an operation system 400.

Next, a configuration, a processing flow, and a concept of the operation system 400 are described. FIG. 3 is a schematic diagram illustrating an example of a configuration of the control unit 450 of the operation system 400.

As illustrated in FIG. 3, the control unit 450 includes an image sensor processor unit 451, a depth map processor unit 452, an image processing unit 453, an anatomy recognition unit 454, a gesture data unit 455, a gesture recognition unit 456, a calibration data unit 457, a composition processor unit 458, an application unit 459, an event service unit 460, a calibration service unit 461, a view service unit 462, a graphics processor unit 463, a display processor unit 464, and a 6-axis sensor driver unit 465.

Note that the control unit 450 does not need to include all the above-mentioned units, and may include one or more necessary units as appropriate. For example, the gesture data unit 455 and the calibration data unit 457 may be arranged on a cloud service, and the composition processor unit 458 may not be particularly provided.

Figure 4:
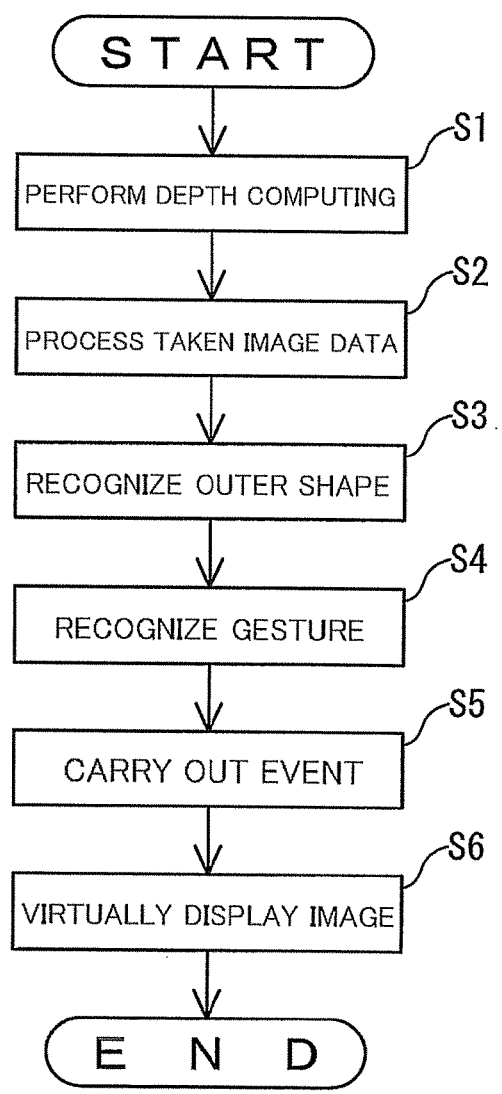
FIG. 4 is a flowchart illustrating a processing flow in the operation system 400.
Figure 5:
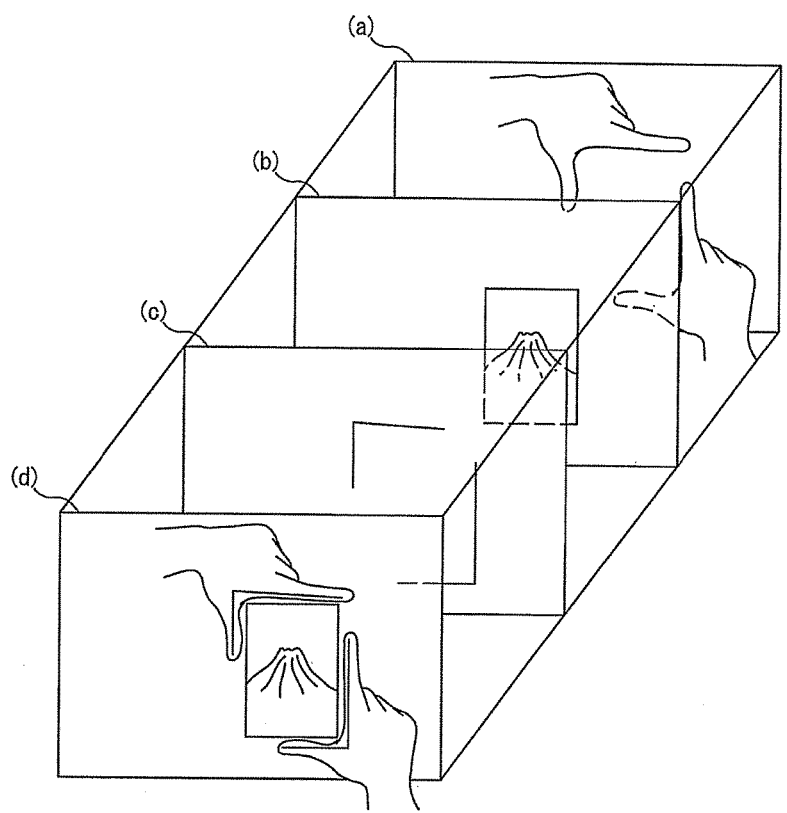
FIG. 5 is a schematic diagram illustrating a concept corresponding to the flowchart of FIG. 4.

Next, FIG. 4 is a flowchart illustrating a processing flow in the operation system 400, and FIG. 5 is a schematic diagram illustrating a concept according to the flowchart of FIG. 4.

First, as illustrated in FIG. 4, target data is acquired from the infrared ray detection unit 410, and depth computing is performed by the depth map processor unit 452 (Step S1). Then, outer shape image data is processed by the image processing unit 453 (Step S2).

Subsequently, on the basis of the structure of a standard human body, an anatomic feature is recognized from the outer shape image data processed in Step S2, by the anatomy recognition unit 454. As a result, an outer shape is recognized (Step S3).

Further, on the basis of the anatomic feature obtained in Step S3, a gesture is recognized by the gesture recognition unit 456 (Step S4).

The gesture recognition unit 456 refers to gesture data recorded in the gesture data unit 455, and recognizes the gesture from the outer shape whose anatomic feature has been recognized. Note that, although it is assumed that the gesture recognition unit 456 refers to the gesture data recorded in the gesture data unit 455, not limited thereto, the gesture recognition unit 456 may refer to other arbitrary data, and may perform processing without any reference.

In such a manner as described above, a gesture of hands is recognized as illustrated in FIG. 5(a).

Subsequently, the application unit 459 and the event service unit 460 carry out a predetermined event in accordance with the gesture recognized by the gesture recognition unit 456 (Step S5).

As a result, as illustrated in FIG. 5(b), for example, an image is displayed by a picture application. On this occasion, taken image data from the camera unit 303 may be displayed on this screen.

Lastly, the view service unit 462, the calibration service unit 461, the graphics processor unit 463, the display processor unit 464, and the composition processor unit 458 display or virtually display an image on the semi-transmissive displays 220 (Step S6). As a result, skeletons of the hands indicating the gesture are displayed as illustrated in FIG. 5(c), and a composite image that is formed such that the shape and size of a picture coincide with the shape and size of the skeletons is displayed as illustrated in FIG. 5(d).

Note that the 6-axis sensor driver unit 465 always detects signals from the gyroscope unit 420 and the acceleration detection unit 430, and transmits a posture condition to the display processor unit 464.

In the case where the user to whom the glasses display device 100 is attached inclines the glasses display device 100, the 6-axis sensor driver unit 465 always receives signals from the gyroscope unit 420 and the acceleration detection unit 430, and controls image display. In this control, the displayed image may be kept horizontal, and may be adjusted in accordance with the inclination.

(One Example of Detection Region and Virtual Display Region)

Next, a relation between a detection region of the infrared ray detection unit 410 of the operation system 400 and a virtual display region of the pair of semi-transmissive displays 220 is described.

Figure 6:
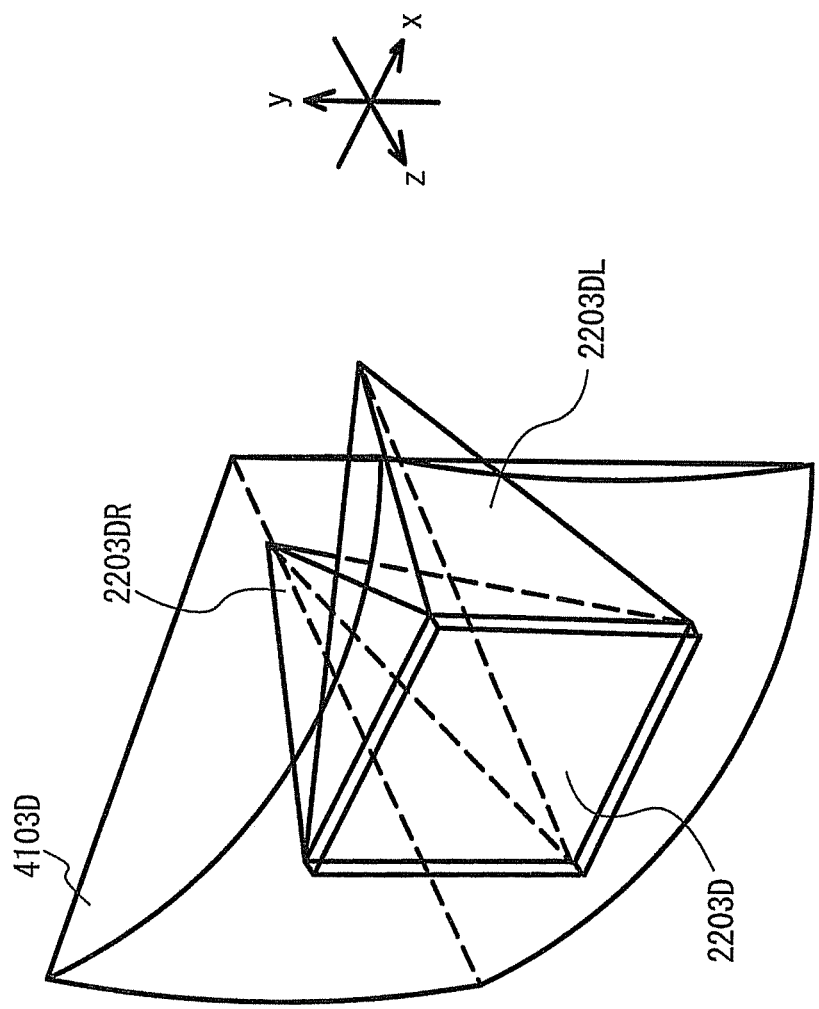
FIG. 6 is a schematic perspective view for describing a detection region of an infrared ray detection unit 410 and a virtual display region of a pair of semi-transmissive displays 220.
Figure 7:
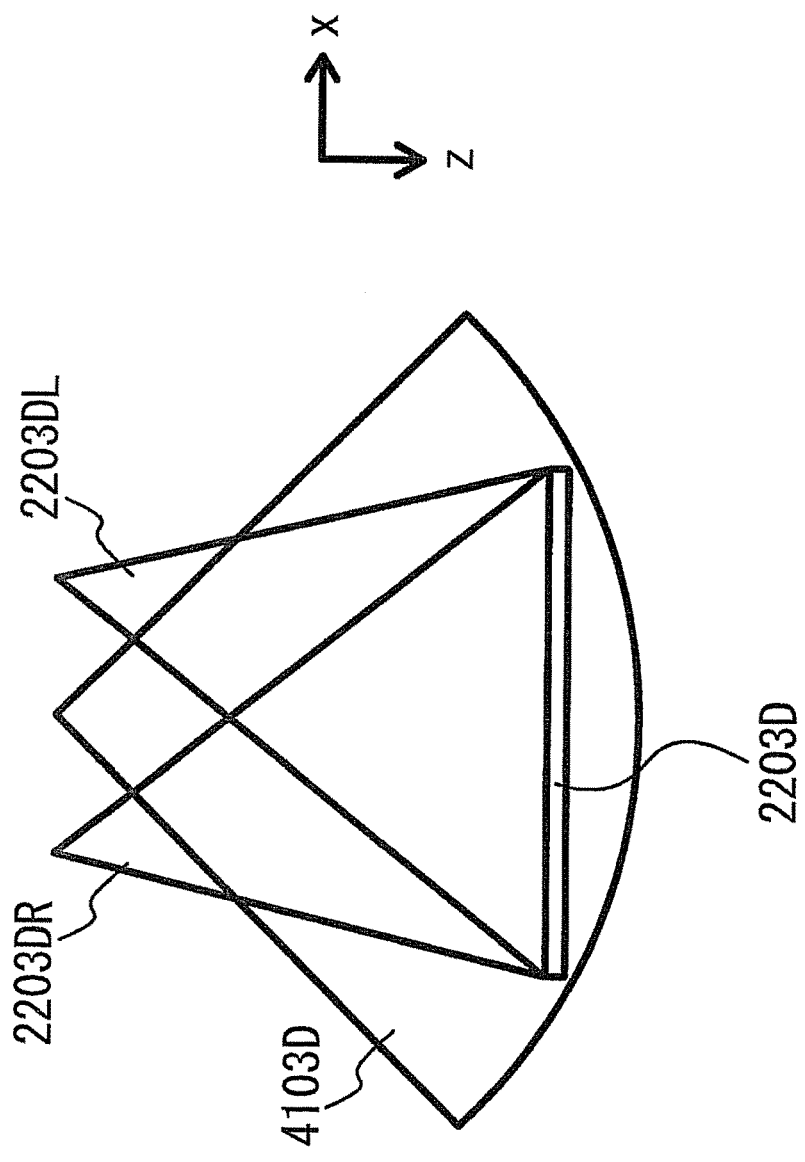
FIG. 7 is a top view of FIG. 6.
Figure 8:
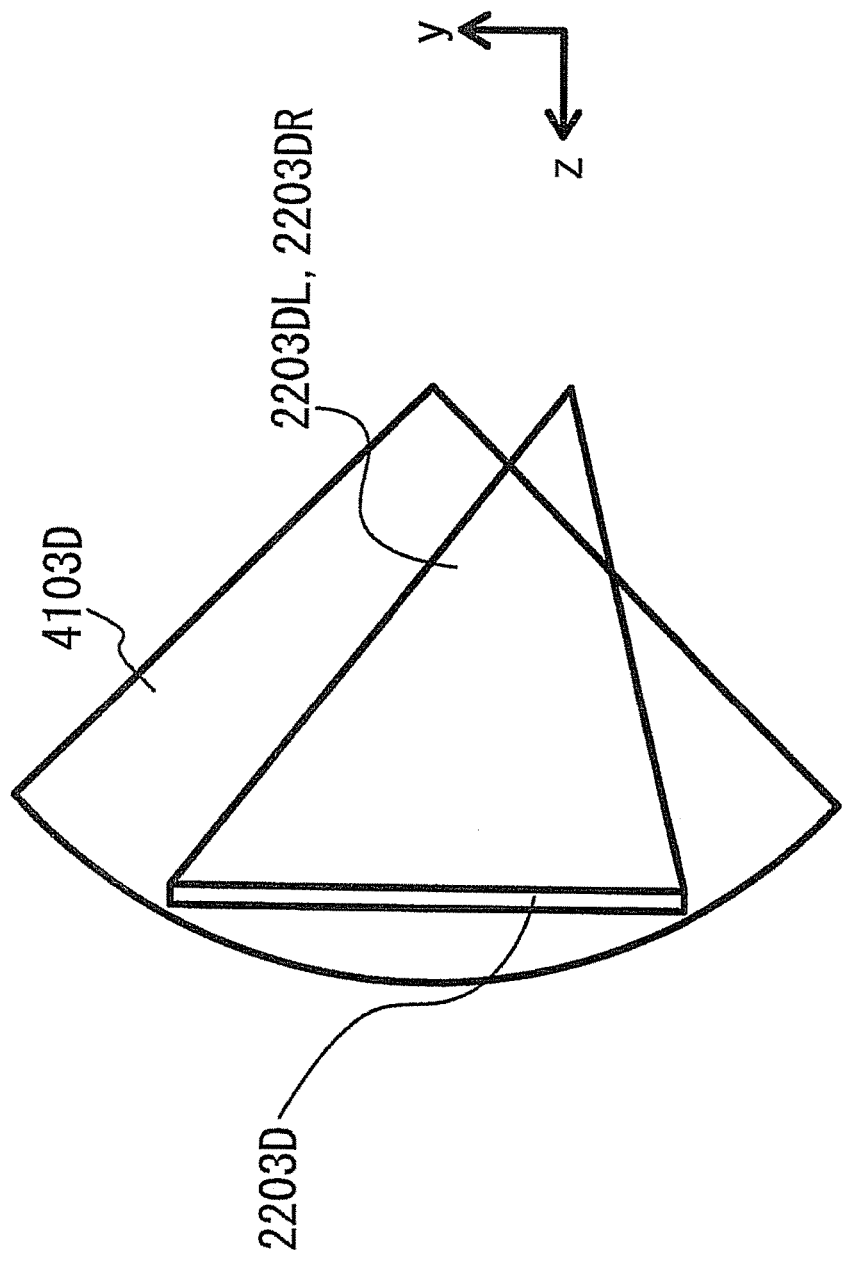
FIG. 8 is a side view of FIG. 6.

FIG. 6 is a schematic perspective view for describing the detection region of the infrared ray detection unit 410 and the virtual display region of the pair of semi-transmissive displays 220, FIG. 7 is a top view of FIG. 6, and FIG. 8 is a side view of FIG. 6.

In the following, for convenience of description, a three-dimensional orthogonal coordinate system formed by an x-axis, a y-axis, and a z-axis is defined as illustrated in FIG. 6. In the following drawings, an x-axis arrow indicates the horizontal direction. A y-axis arrow indicates the vertical direction or the long axis direction of the user's body. A z-axis arrow indicates the depth level direction. The z-axis positive direction indicates the direction of a higher depth level. The direction of each arrow is the same in the other drawings.

As illustrated in FIG. 6 to FIG. 8, a three-dimensional space detection region (3D space) 4103D in which detection by the infrared ray detection unit 410 of the operation system 400 is possible is provided.

The three-dimensional space detection region 4103D is formed by a conical or pyramidal three-dimensional space extending from the infrared ray detection unit 410.

That is, infrared rays emitted from the infrared ray emission element 411 can be detected by the infrared ray detection camera 412, and hence the infrared ray detection unit 410 can recognize a gesture in the three-dimensional space detection region 4103D.

Moreover, although one infrared ray detection unit 410 is provided in the present embodiment, not limited thereto, a plurality of the infrared ray detection units 410 may be provided, and one infrared ray emission element 411 and a plurality of the infrared ray detection cameras 412 may be provided.

Subsequently, as illustrated in FIG. 6 to FIG. 8, the pair of semi-transmissive displays 220 is visually recognized by the user as a virtual display with a depth in not an actual place of the glasses display device 100 but a virtual image display region 2203D that is a place apart from the glasses display device 100. The depth corresponds to the thickness in the depth level direction (z-axis direction) of a virtual stereoscopic shape of the virtual image display region 2203D. Accordingly, the depth is provided in accordance with the thickness in the depth level direction (z-axis direction) of the virtual stereoscopic shape.

That is, although images are respectively displayed on the semi-transmissive displays 220 of the glasses display device 100 in actuality, a right-eye image is transmitted through the semi-transmissive display 220 on the right-eye side to be recognized by the user in a three-dimensional space region 2203DR, and a left-eye image is transmitted through the semi-transmissive display 220 on the left-eye side to be recognized by the user in a three-dimensional space region 2203DL. As a result, the two recognized images are composited with each other in the brain of the user, whereby the user can recognize the two images as a virtual image in the virtual image display region 2203D.

Moreover, the virtual image display region 2203D is displayed using any of a frame sequential method, a polarization method, a linear polarization method, a circular polarization method, a top-and-bottom method, a side-by-side method, an anaglyph method, a lenticular method, a parallax barrier method, a liquid crystal parallax barrier method, a two-parallax method, and a multi-parallax method using three or more parallaxes.

Moreover, in the present embodiment, the virtual image display region 2203D includes a space region common to the three-dimensional space detection region 4103D. In particular, as illustrated in FIG. 6 and FIG. 7, the virtual image display region 2203D exists inside of the three-dimensional space detection region 4103D, and hence the virtual image display region 2203D corresponds to the common region.

Note that the shape and size of the virtual image display region 2203D can be arbitrarily adjusted by a display method on the pair of semi-transmissive displays 220.

Moreover, as illustrated in FIG. 8, description is given above of the case where the infrared ray detection unit 410 is arranged above (y-axis positive direction) the pair of semi-transmissive displays 220. Even if the arrangement position in the vertical direction (y-axis direction), of the infrared ray detection unit 410 is below (y-axis negative direction) the semi-transmissive displays 220 or the same as the position of the semi-transmissive displays 220, the virtual image display region 2203D similarly includes a space region common to the three-dimensional space detection region 4103D.

(Other Examples of Detection Region and Virtual Display Region)

Figure 9:
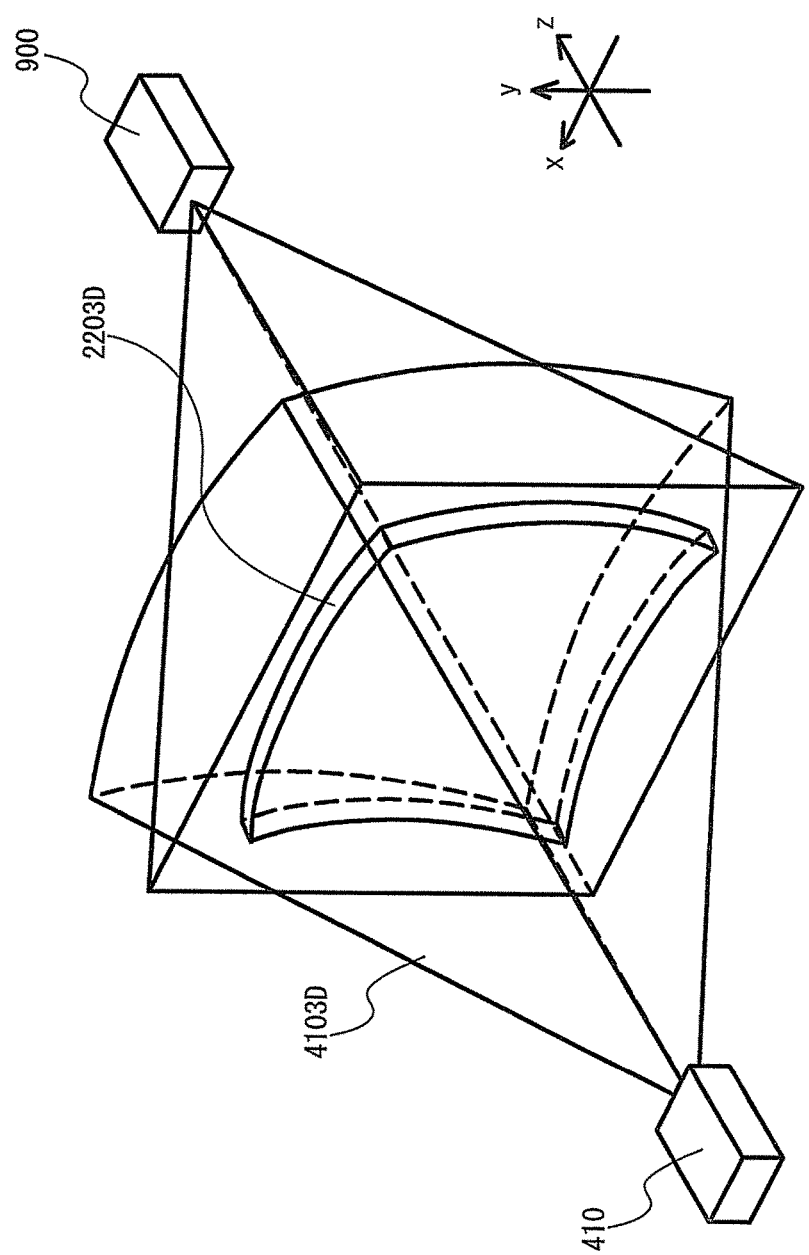
FIG. 9 is a schematic diagram illustrating another example of the detection region and the virtual display region.
Figure 10:
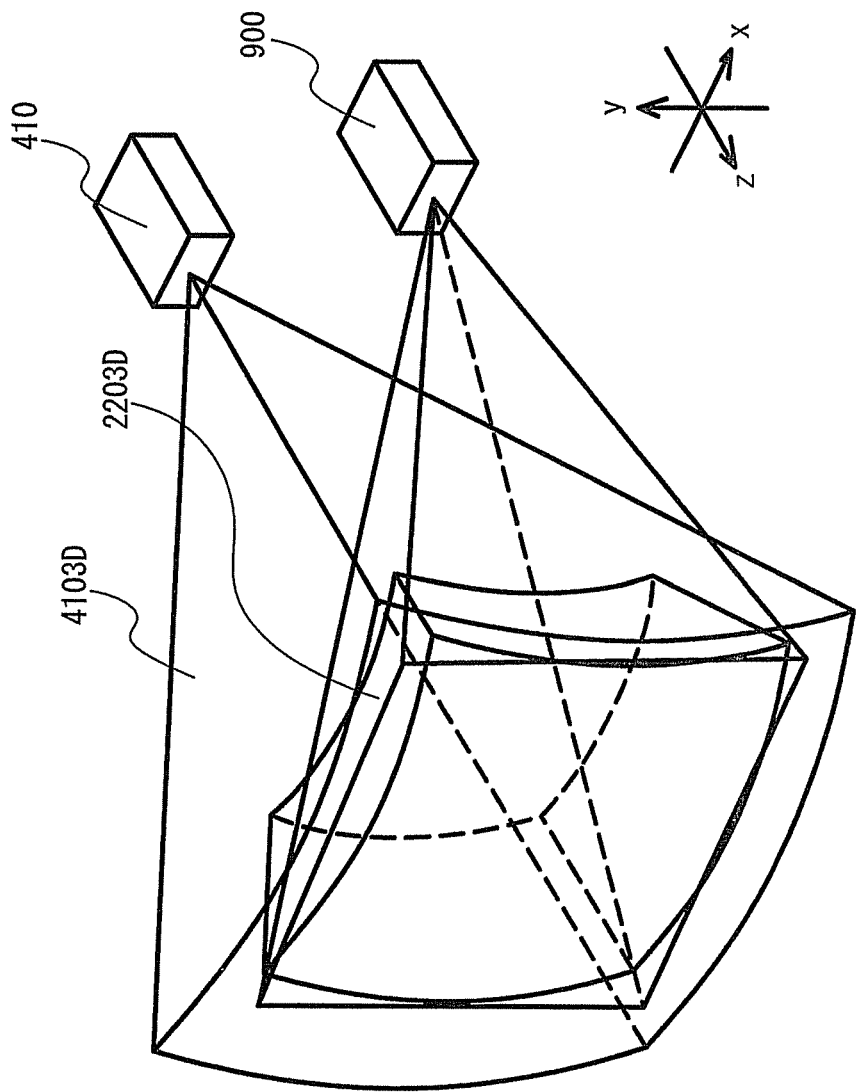
FIG. 10 is a schematic diagram illustrating another example of the detection region and the virtual display region.
Figure 11:
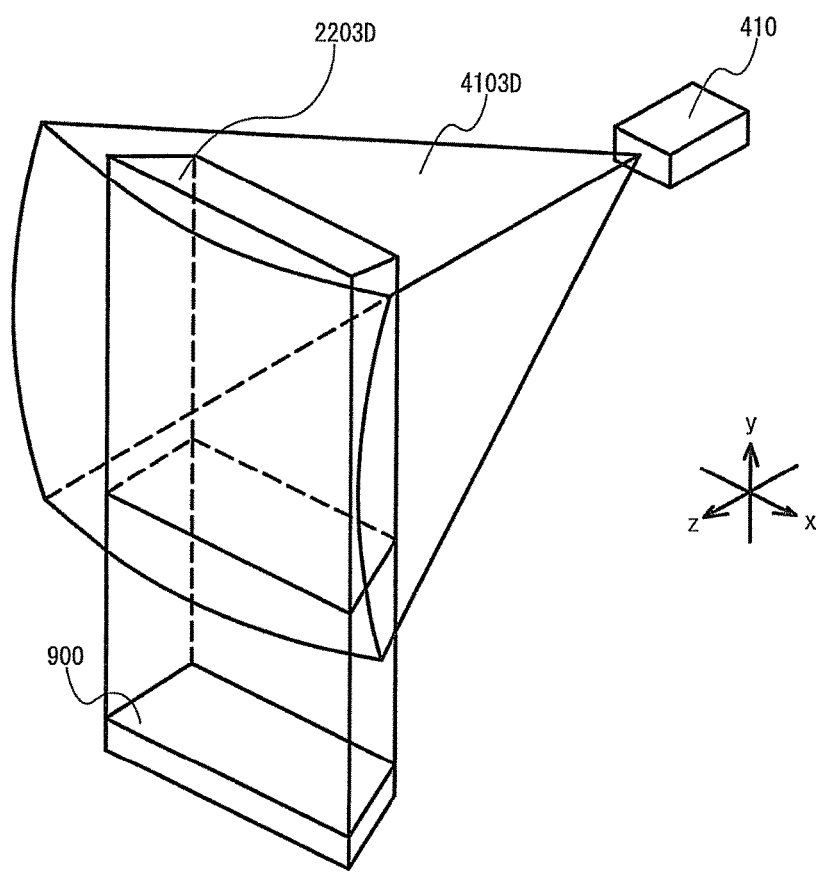
FIG. 11 is a schematic diagram illustrating another example of the detection region and the virtual display region.

Next, FIG. 9 to FIG. 11 are schematic diagrams respectively illustrating other examples of the detection region and the virtual display region illustrated in FIG. 6 to FIG. 8.

For example, as illustrated in FIG. 9 to FIG. 11, other I/O devices, display devices, televisions, monitors, and the like may be used instead of the semi-transmissive displays 220 of the glasses display device 100. Hereinafter, other I/O devices, display devices, televisions, monitors, and projectors are collectively referred to as an I/O device 900.

As illustrated in FIG. 9, the virtual image display region 2203D may be outputted in the z-axis negative direction from the I/O device 900, and the three-dimensional space detection region 4103D may be formed in the z-axis positive direction from the infrared ray detection unit 410 that is positioned so as to be opposed to the I/O device 900 in the z-axis direction.

In this case, the virtual image display region 2203D outputted by the I/O device 900 is generated as a space region common to the three-dimensional space detection region 4103D.

Moreover, as illustrated in FIG. 10, the virtual image display region 2203D may be outputted from the I/O device 900, and the three-dimensional space detection region 4103D of the infrared ray detection unit 410 may be formed in the same direction as that of the I/O device 900 (both in the z-axis positive direction with respect to the x-y plane).

Also in this case, the virtual image display region 2203D outputted by the I/O device 900 is generated as a space region common to the three-dimensional space detection region 4103D.

Then, as illustrated in FIG. 11, the virtual image display region 2203D may be outputted in the vertical upward direction (y-axis positive direction) from the I/O device 900. Also in FIG. 11, similarly to FIG. 9 and FIG. 10, the virtual image display region 2203D outputted by the I/O device 900 is generated as a space region common to the three-dimensional space detection region 4103D.

Moreover, although not illustrated, the I/O device 900 may be arranged on the upper side (y-axis positive direction side) of the three-dimensional space detection region 4103D, and the virtual image display region 2203D may be outputted in the vertical downward direction (y-axis negative direction). The virtual image display region 2203D may be outputted in the horizontal direction (x-axis direction). Like a projector or a movie theater, the virtual image display region 2203D may be outputted from the upper back side (the z-axis positive direction and the y-axis positive direction).

(Manipulation Region and Gesture Region)

Figure 12:
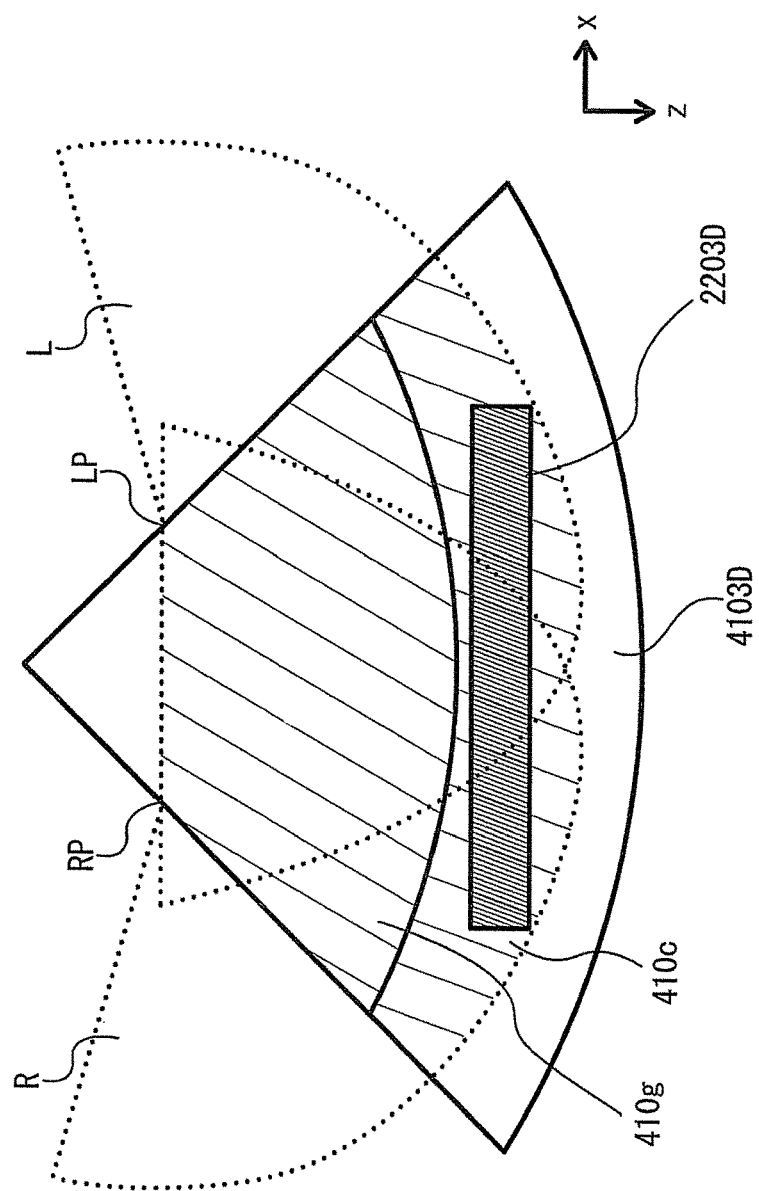
FIG. 12 is a schematic diagram illustrating an example of a manipulation region and a gesture region in the detection region.
Figure 13:
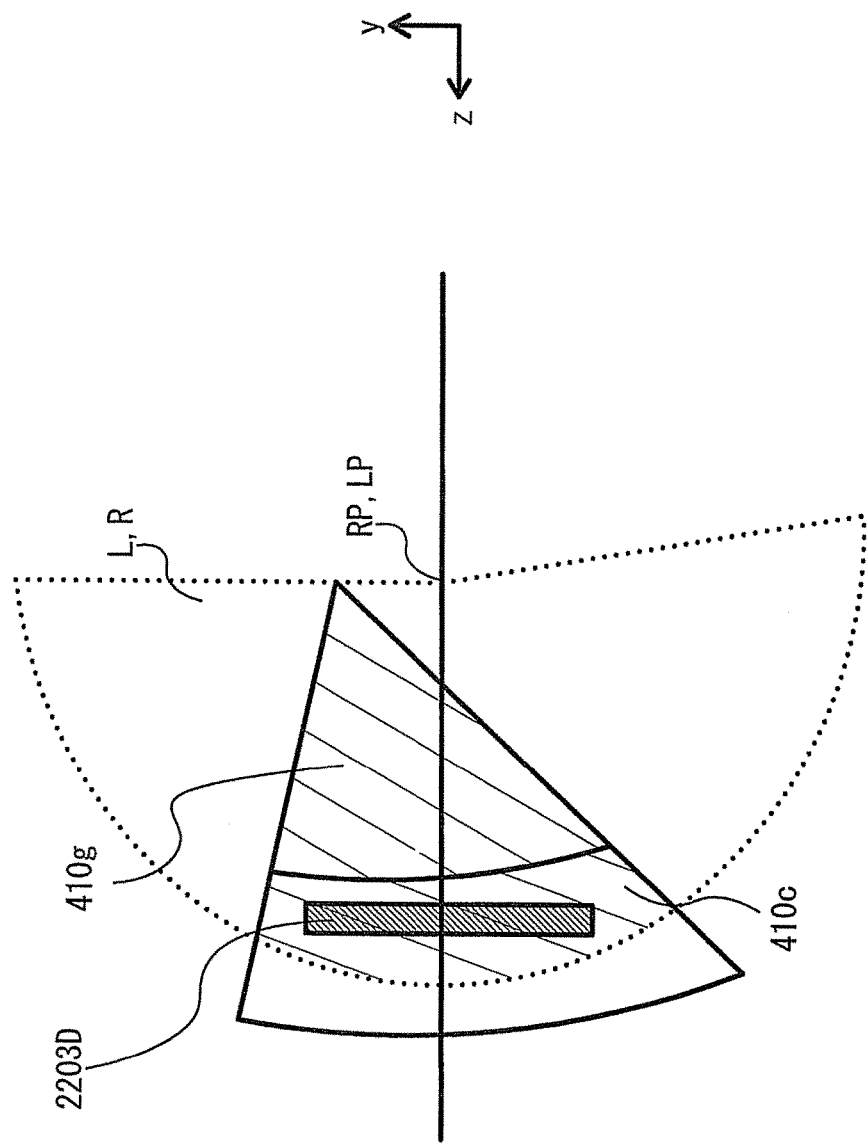
FIG. 13 is a schematic diagram illustrating an example of the manipulation region and the gesture region in the detection region.

Next, a manipulation region and a gesture region in the detection region are described. FIG. 12 and FIG. 13 are schematic diagrams illustrating an example of the manipulation region and the gesture region in the detection region.

First, as illustrated in FIG. 12, in general, the user horizontally moves both his/her hands about both his/her shoulder joints (a right shoulder joint RP and a left shoulder joint LP) as the respective centers of rotation, and hence both his/her hands can respectively move within a movement region L and a movement region R surrounded by dotted lines.

Moreover, as illustrated in FIG. 13, in general, the user vertically moves both his/her hands about both his/her shoulder joints (the right shoulder joint RP and the left shoulder joint LP) as the respective centers of rotation, and hence both his/her hands can respectively move within the movement region L and the movement region R surrounded by dotted lines.

That is, as illustrated in FIG. 12 and FIG. 13, the user can move both his/her hands about the right shoulder joint RP and the left shoulder joint LP as the respective centers of rotation, in a three-dimensional space having an imperfect spherical shape (having an arch-like curved surface that is convex in the depth level direction).

Then, an overlapping space region of all of regions is set as a manipulation region 410c, wherein said all of regions comprise: the three-dimensional space detection region 4103D of the infrared ray detection unit 410; a region in which a virtual image display region can exist (in FIG. 12, the virtual image display region 2203D is illustrated as an example); and a region obtained by integrating the arm movement region L and the arm movement region R is set as a manipulation region 410c.

Moreover, a portion other than the manipulation region 410c in the three-dimensional space detection region 4103D is set as a gesture region 410g, the portion overlapping with the region obtained by integrating the arm movement region L and the arm movement region R.

Here, the manipulation region 410c has a stereoscopic shape whose farthest surface in the depth level direction is an arch-like curved surface that is convex in the depth level direction (z-axis positive direction), whereas the virtual image display region 2203D has a stereoscopic shape whose farthest surface in the depth level direction is a planar surface. Due to such a difference in the shape of the farthest surface between the two regions, the user physically feels a sense of discomfort during the manipulation. In order to solve the sense of discomfort, adjustment is performed in a calibration process. Moreover, the details of the calibration process are described below.

(Description of Calibration)

Figure 14:
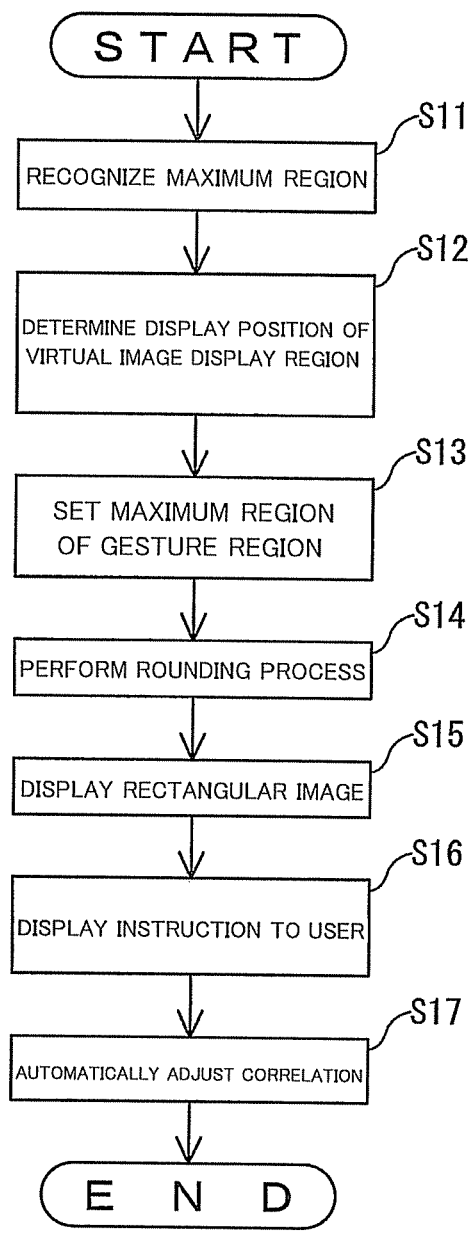
FIG. 14 is a flowchart for describing a calibration process.

Next, the calibration process is described. FIG. 14 is a flowchart for describing the calibration process.

As illustrated in FIG. 12 and FIG. 13, when the user tries to move his/her hand(s) along the virtual image display region 2203D, the user needs to move his/her hand(s) along a plane without any guide. Accordingly, the calibration process is performed to facilitate the manipulation in the virtual image display region 2203D through a reorganization process to be described below.

Moreover, in the calibration process, the finger length, the hand length, and the arm length, which are different for each user, are also adjusted.

Hereinafter, description is given with reference to FIG. 14. First, the glasses display device 100 is attached to the user, and the user maximally stretches both his/her arms. As a result, the infrared ray detection unit 410 recognizes the maximum region of the manipulation region 410c (Step S11).

That is, because the finger length, the hand length, and the arm length are different for each user, the manipulation region 410c is adjusted to suit each user.

Then, in the glasses display device 100, a display position of the virtual image display region 2203D is determined (Step S12). That is, if the virtual image display region 2203D is arranged outside of the manipulation region 410c, a user's manipulation becomes impossible, and hence the virtual image display region 2203D is arranged inside of the manipulation region 410c.

Subsequently, the maximum region of the gesture region 410g is set within the three-dimensional space detection region 4103D of the infrared ray detection unit 410 of the glasses display device 100 so as not to overlap with the display position of the virtual image display region 2203D (Step S13).

Note that it is preferable that the gesture region 410g be arranged so as not to overlap with the virtual image display region 2203D and be provided with a thickness in the depth direction (z-axis positive direction).

In the present embodiment, the manipulation region 410c, the virtual image display region 2203D, and the gesture region 410g are set in such a manner as described above.

Next, calibration of the virtual image display region 2203D in the manipulation region 410c is described.

In the case where it is determined that the finger(s), the hand(s), or the arm(s) of the user exist around the outside of the virtual image display region 2203D in the manipulation region 410c, such rounding as if the finger(s), the hand(s), or the arm(s) of the user existed inside of the virtual image display region 2203D is performed (Step S14).

As illustrated in FIG. 12 and FIG. 13, in a region near a central part of an image virtually displayed by the semi-transmissive displays 220, if the user maximally stretches both his/her arms, the tips of both his/her hands do not stay within the virtual image display region 2203D and go out thereof in the depth direction (z-axis positive direction). Meanwhile, in an end part of the virtually displayed image, unless the user maximally stretches both his/her arms, it is not determined that the tips of both his/her hands exist within the virtual image display region 2203D.

Hence, if a signal from the infrared ray detection unit 410 is used without being processed, even if the tips of his/her hands go out of the virtual image display region 2203D, the user has difficulty in physically feeling such a state.

Accordingly, in the process of Step S14 in the present embodiment, the signal from the infrared ray detection unit 410 is processed such that the tips of his/her hands that protrude to the outside of the virtual image display region 2203D are corrected to exist within the virtual image display region 2203D.

As a result, in the state where the user maximally stretches or slightly bends both his/her arms, a manipulation from the central part to the end part in the planar virtual image display region 2203D with a depth is possible.

Note that, although the virtual image display region 2203D is formed by a three-dimensional space region whose farthest surface in the depth level direction is a planar surface in the present embodiment, not limited thereto, the virtual image display region 2203D may be formed by a three-dimensional space region that is a curved surface having a shape along the farthest surfaces in the depth level direction of the farthest surface regions L and R in the depth level direction. As a result, in the state where the user maximally stretches or slightly bends both his/her arms, a manipulation from the central part to the end part in the planar virtual image display region 2203D with a depth is possible.

Further, the semi-transmissive displays 220 display a rectangular image in the virtual image display region 2203D. For example, as illustrated in FIG. 5(b), the semi-transmissive displays 220 display a rectangular image (Step S15).

Subsequently, an instruction to the effect that "please surround the displayed image with your fingers" is displayed on the semi-transmissive displays 220 (Step S16). Here, a finger-shaped image may be softly displayed in the vicinity of the image, and a vocal instruction from the speaker may be given to the user instead of such display on the semi-transmissive displays 220.

According to the instruction, the user places his/her fingers on a portion of the image as illustrated in FIG. 5(d). Then, a correlation between the display region of the virtual image display region 2203D and the infrared ray detection unit 410 is automatically adjusted (Step S17).

Note that, in the above example, the user defines a rectangular with his/her fingers, and places the rectangular thus defined on the rectangular of the outer edge of the image. For this reason, the visual recognition size and position of the rectangular defined by his/her fingers is made coincident with the visual recognition size and position of the rectangular of the outer edge of the image. However, the method of defining a shape with fingers is not limited thereto, and may be other arbitrary methods such as a method of tracing the outer edge of the displayed image with a finger and a method of pointing to a plurality of points on the outer edge of the displayed image with a finger. Moreover, these methods may be applied to images having a plurality of sizes.

Note that, although only the case of the glasses display device 100 is taken in the above description of the calibration process, in the case of the I/O device 900, an image may be displayed in the process of Step S11, and a correlation between the displayed image and the infrared ray detection unit 410 may be adjusted in the process of Step S17.

(Finger, Palm, and Arm Recognition)

Figure 15:
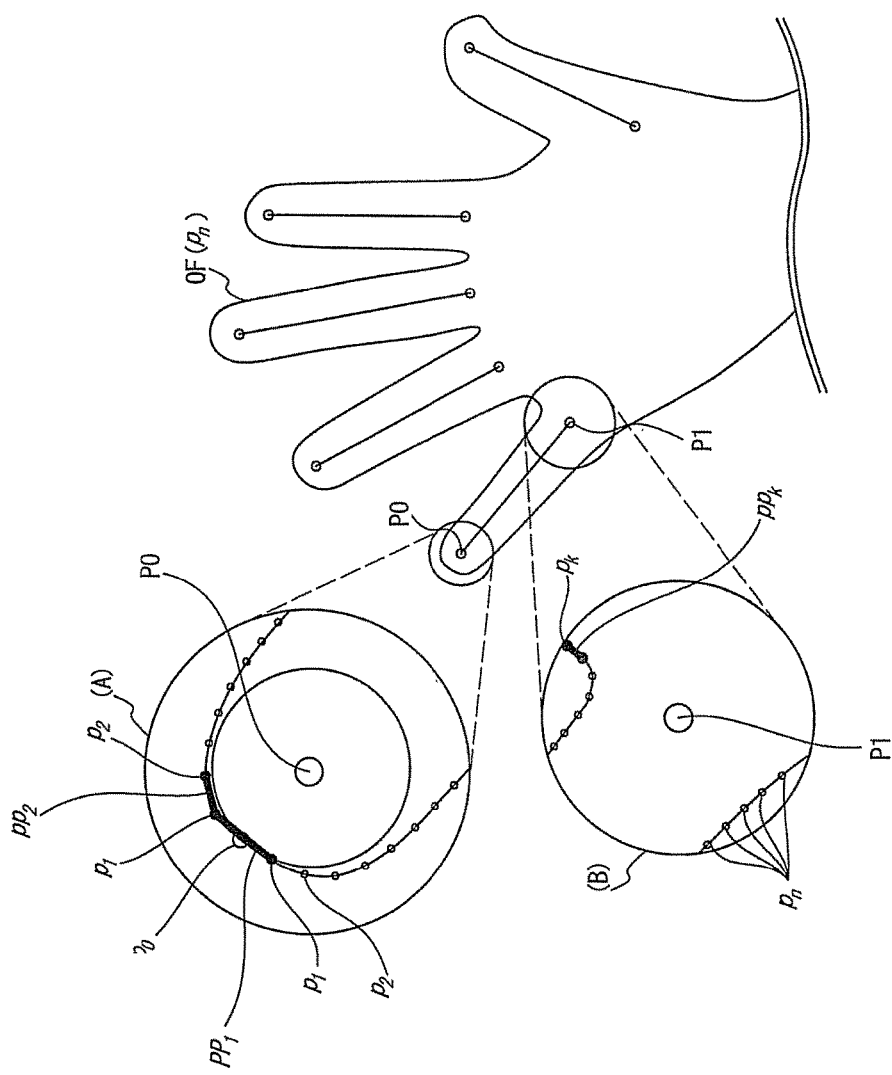
FIG. 15 is a schematic diagram illustrating an example of finger recognition.
Figure 16:
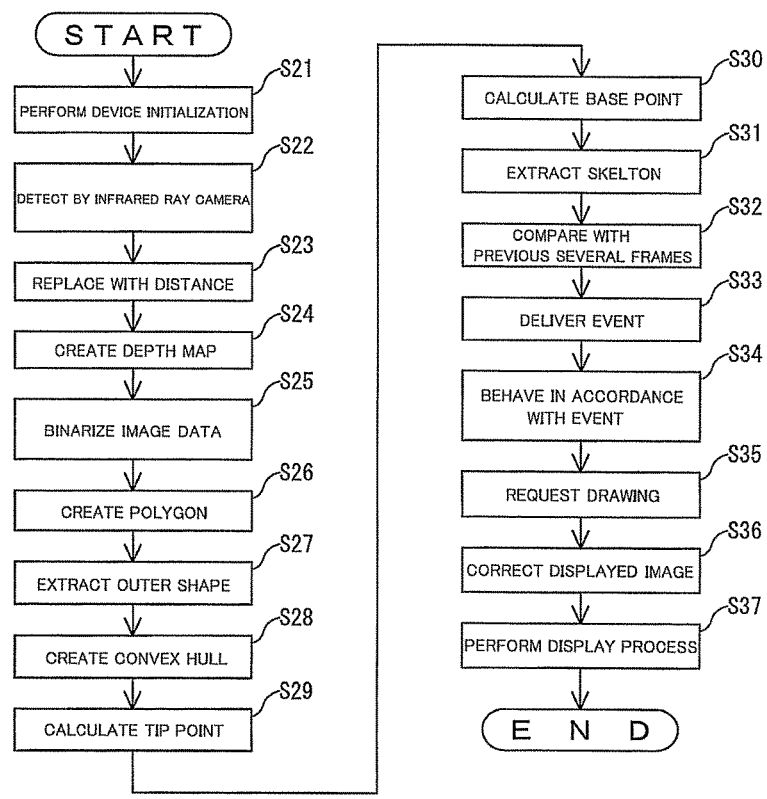
FIG. 16 is a flowchart illustrating an example of a finger recognition process.

Next, finger recognition is described, followed by description of palm recognition and arm recognition in the stated order. FIG. 15 is a schematic diagram illustrating an example of the finger recognition. In FIG. 15, (A) is an enlarged view of the vicinity of the tip of a finger, and (B) is an enlarged view of the vicinity of the base of the finger. FIG. 16 is a flowchart illustrating an example of the finger recognition process.

As illustrated in FIG. 16, in the present embodiment, device initialization is performed (Step S21). Then, an infrared ray that has been emitted from the infrared ray emission element 411 and has been reflected on a hand is detected by the infrared ray detection camera 412 (Step S22).

Then, image data is replaced with a distance on a pixel basis by the infrared ray detection unit 410 (Step S23). In this case, the luminance of the infrared ray is inversely proportional to the cube of the distance. A depth map is created using this fact (Step S24).

Subsequently, an appropriate threshold is set to the created depth map. Then, the image data is binarized (Step S25). That is, noise is removed from the depth map.

Subsequently, a polygon having about 100 vertexes is created from the binarized image data (Step S26). Then, a new polygon having a larger number of vertexes $p_n$ is created using a low-pass filter (LPF) such that the vertexes become smoother, whereby an outer shape OF of the hand illustrated in FIG. 15 is extracted (Step S27).

Note that, although the number of vertexes that are extracted from the data binarized in Step S26 in order to create a polygon is about 100 in the present embodiment, not limited thereto, the number of vertexes may be 1,000 or other arbitrary numbers.

A convex hull is extracted using Convex Hull from the set of the vertexes $p_n$ of the new polygon created in Step S27 (Step S28).

After that, a vertex $p_0$ common between the new polygon created in Step S27 and the convex hull created in Step S28 is extracted (Step S29). The common vertex $p_0$ itself thus extracted can be used as a tip point of the finger.

Further, another point calculated on the basis of the position of the vertex $p_0$ may be used as the tip point of the finger. For example, as illustrated in FIG. 15(A), the center of an inscribed circle of the outer shape OF at the vertex $p_0$ may also be calculated as a tip point P0.

Then, as illustrated in FIG. 15, a vector of a reference line segment $PP_1$ that passes through a pair of right and left vertexes $p_1$ adjacent to the vertex $p_0$ is calculated. After that, a side $pp_2$ connecting each vertex $p_1$ and a vertex $p_2$ adjacent thereto is selected, and a vector of the side $pp_2$ is calculated. Similarly, with the use of the vertexes $p_n$ forming the outer shape OF, such a process of obtaining a vector of each side is repeated along the outer periphery of the outer shape OF. The direction of each side and the direction of the reference line segment $PP_1$ calculated in the process of Step S30 are compared with each other, and a side $pp_k$ that is close to parallel to the reference line segment $PP_1$ is determined to exist at the position of a valley between fingers. Then, a base point P1 of the finger is calculated on the basis of the position of the side $pp_k$ (Step S30). A skeleton of the finger can be obtained by connecting the tip point P0 of the finger and the base point P1 of the finger using a straight line (Step S31). If the skeleton of the finger are obtained, the extending direction of the finger can be recognized.

A similar process is performed on all the fingers, whereby the skeletons of all the fingers are obtained. As a result, the pose of the hand can be recognized. That is, it can be recognized which of the thumb, the index finger, the middle finger, the ring finger, and the little finger is stretched and which thereof is bent.

Subsequently, a difference in the pose of the hand is detected in comparison with image data of several frames taken immediately before (Step S32). That is, movement of the hand can be recognized through the comparison with the image data of the several frames taken immediately before.

Subsequently, the recognized shape of the hand is event-delivered as gesture data to the event service unit 460 (Step S33).

Subsequently, a behavior according to the event is carried out by the application unit 459 (Step S34).

Subsequently, drawing in a three-dimensional space is requested by the view service unit 462 (Step S35).

The graphics processor unit 463 refers to the calibration data unit 457 using the calibration service unit 461, and corrects the displayed image (Step S36).

Lastly, the resultant image is displayed on the semi-transmissive displays 220 by the display processor unit 464 (Step S37).

Note that, although the base point of each finger is detected through the process of Step S30 and the process of Step S31 in the present embodiment, the method of detecting the base point is not limited thereto. For example, first, the length of the reference line segment $PP_1$ is calculated, the reference line segment $PP_1$ connecting the pair of vertexes $p_1$ that are adjacent to the vertex $p_0$ on one side and another side of the vertex $p_0$, respectively. Then, the length of a line segment connecting the pair of vertexes $p_2$ on the one side and the another side is calculated. Similarly, the length of each line segment connecting a pair of vertexes on the one side and the another side is calculated in order from vertexes positioned closer to the vertex $p_0$ to vertexes positioned farther therefrom. Such line segments do not intersect with one another inside of the outer shape OF, and are substantially parallel to one another. In the case where the vertexes at both the ends of such a line segment are in the portion of the finger, the length of the line segment corresponds to the width of the finger, and hence the amount of change thereof is small. Meanwhile, in the case where at least any of the vertexes at both the ends of such a line segment reaches the portion of the valley between the fingers, the amount of change of the length becomes larger. Accordingly, a line segment that has the length whose amount of change does not exceed a predetermined amount and is the farthest from the vertex $p_0$ is detected, and one point on the detected line segment is extracted, whereby the base point can be determined.

(Palm Recognition)

Figure 17:
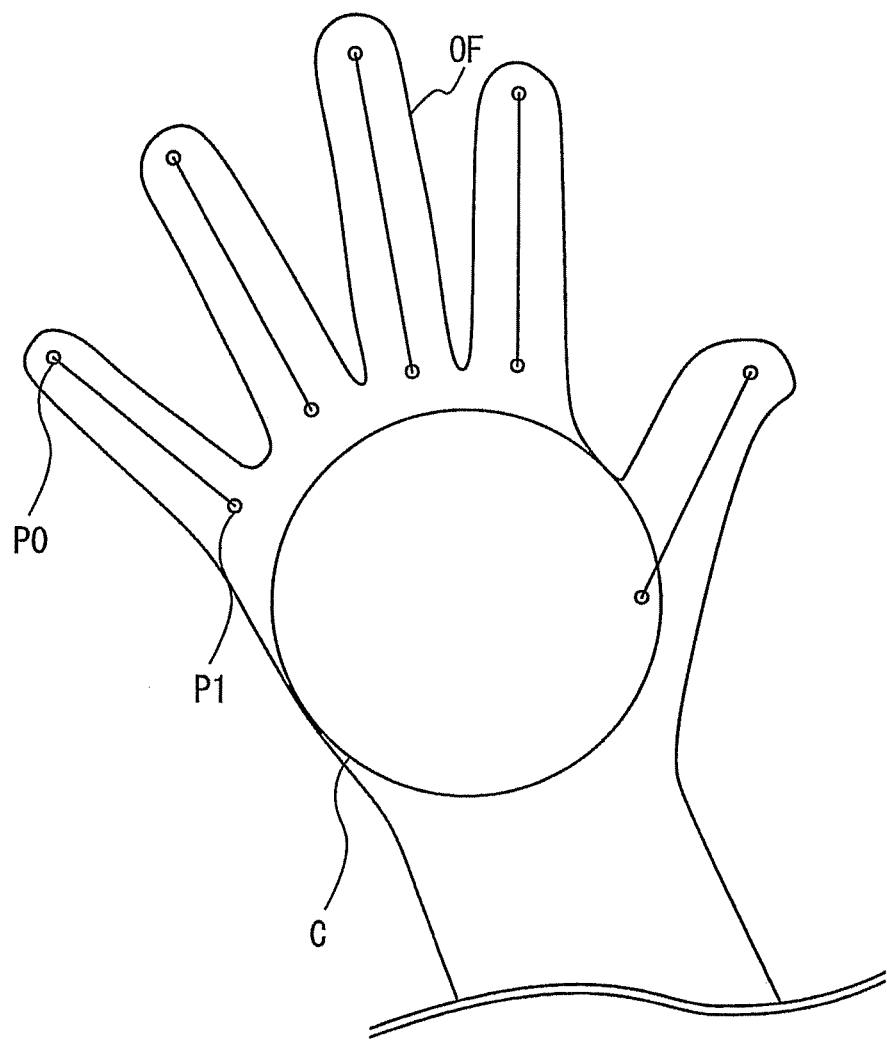
FIG. 17 is a schematic diagram illustrating an example of palm recognition.

Next, FIG. 17 is a schematic diagram illustrating an example of the palm recognition.

As illustrated in FIG. 17, after the finger recognition is carried out, a maximum inscribed circle C inscribed in the outer shape OF of the image data is extracted. The position of the maximum inscribed circle C can be recognized as the position of the palm.

Figure 18:
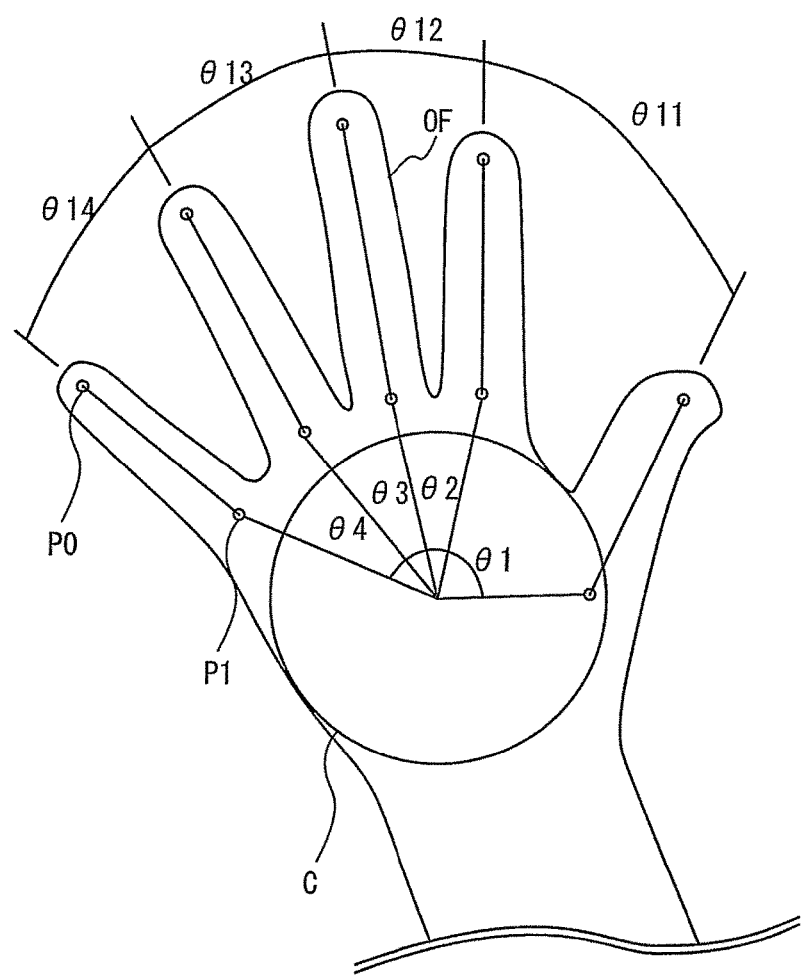
FIG. 18 is a schematic diagram illustrating an example of thumb recognition.

Next, FIG. 18 is a schematic diagram illustrating an example of thumb recognition.

As illustrated in FIG. 18, the thumb has features different from those of the other four fingers of the index finger, the middle finger, the ring finger, and the little finger. For example, among angles θ1, θ2, θ3, and θ4 mutually formed by straight lines connecting: the center of the maximum inscribed circle C indicating the position of the palm; and the respective base points P1 of the fingers, θ1 concerning the thumb tends to be the largest. Moreover, among angles θ11, θ12, θ13, and θ14 mutually formed by straight lines connecting: the respective tip points P0 of the fingers; and the respective base points P1 of the fingers, θ11 concerning the thumb tends to be the largest. The thumb is determined on the basis of such tendencies. As a result, it can be determined whether the image data is a right hand or a left hand or whether the image data is the front side or the back side of the palm.

(Arm Recognition)

Next, the arm recognition is described. In the present embodiment, the arm recognition is carried out after any of the fingers, the palm, and the thumb is recognized. Note that the arm recognition may also be carried out before any of the fingers, the palm, and the thumb is recognized or at the same time as at least any thereof is recognized.

In the present embodiment, a polygon is extracted from a region larger than the polygon of the shape of the hand of the image data. For example, the processes of Steps S21 to S27 are carried out in a length range of 5 cm or more and 100 cm or less and, more preferably, a length range of 10 cm or more and 40 cm or less, so that an outer shape is extracted.

After that, a quadrangular frame circumscribed around the extracted outer shape is selected. In the present embodiment, the shape of the quadrangular frame is a parallelogram or a rectangle.

In this case, because the parallelogram or the rectangle has longer sides opposed to each other, the extending direction of the arm can be recognized from the extending direction of the longer sides, and the direction of the arm can be determined from the direction of the longer sides. Note that, similarly to the process of Step S32, movement of the arm may be detected in comparison with image data of several frames taken immediately before.

Note that, although the fingers, the palm, the thumb, and the arm are detected from a two-dimensional image in the above description, not limited thereto, the infrared ray detection unit 410 may be further provided, or only the infrared ray detection camera 412 may be further provided, and a three-dimensional image may be recognized from two-dimensional images. As a result, the recognition accuracy can be further enhanced.

(View Example of Semi-Transmissive Display)

Figure 19:
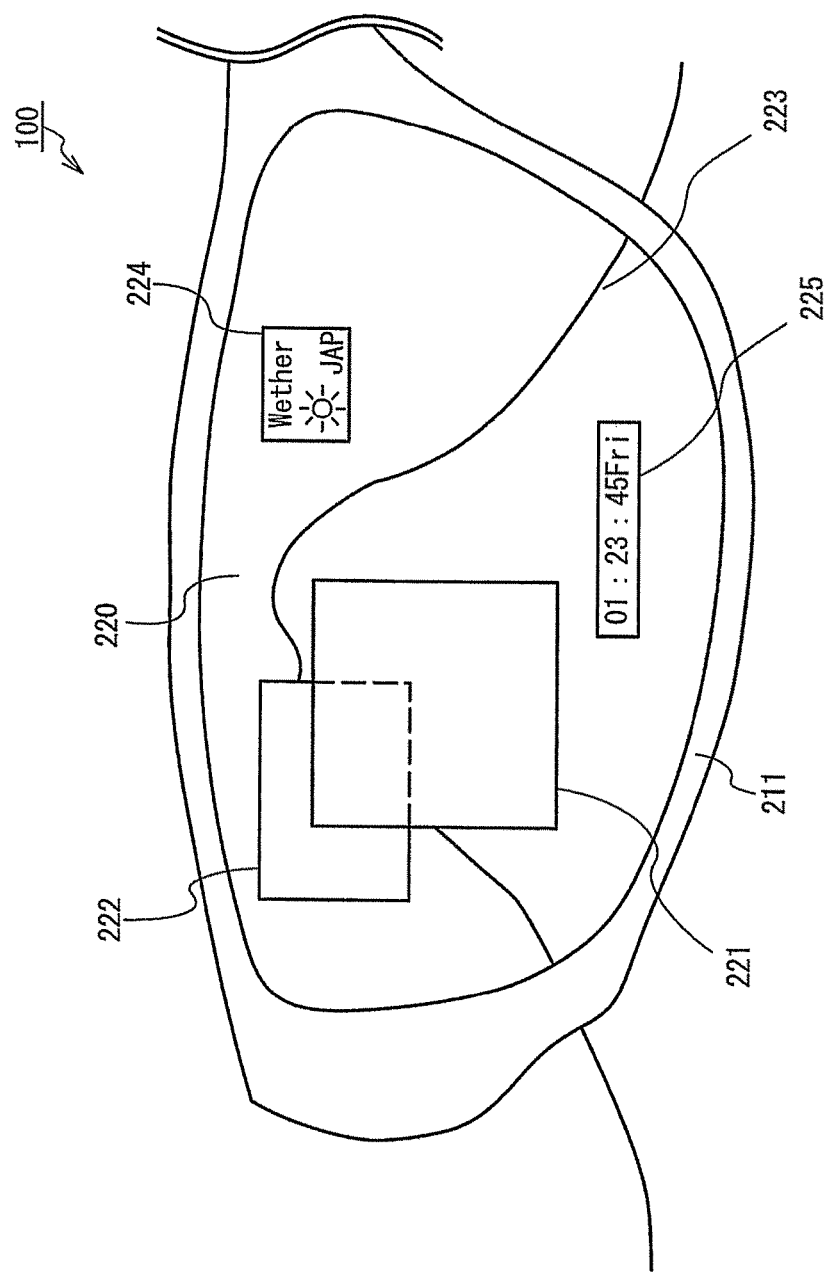
FIG. 19 is a schematic diagram illustrating an example of a view of the semi-transmissive display 220 of the glasses display device 100.

Next, FIG. 19 is a schematic diagram illustrating an example of a view of the semi-transmissive display 220 of the glasses display device 100.

As illustrated in FIG. 19, on the semi-transmissive display 220 of the glasses display device 100, an advertisement 221 is partially displayed, and a map 222 is further partially displayed. In addition, through the semi-transmissive display 220 of the glasses display device 100, scenery 223 is visually recognized. In addition, weather forecast 224 and time 225 are displayed thereon.

(Description of Field of View)

Figure 20:
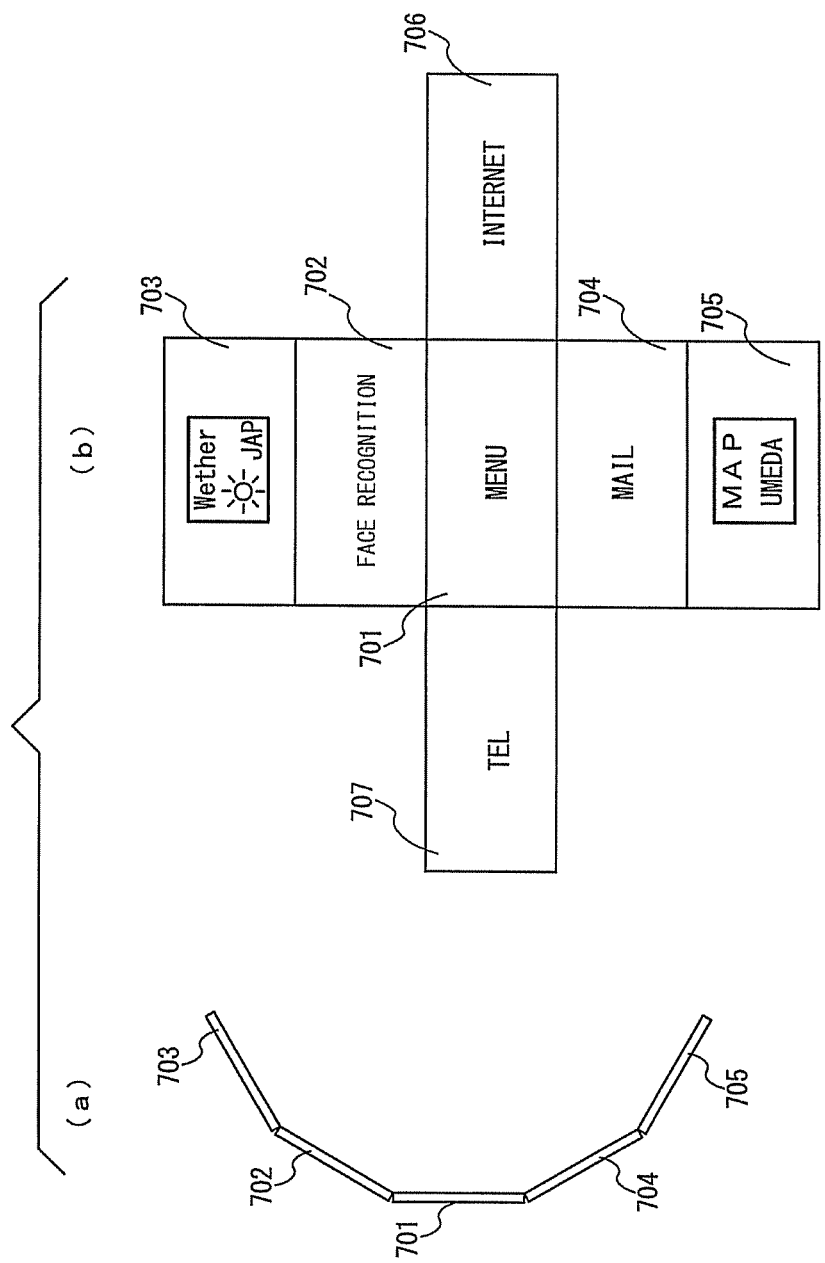
FIG. 20 is a schematic diagram illustrating an example (a) of a field of view of the semi-transmissive display 220 and an example (b) of the view of the semi-transparent display 220.

Next, an example of the view displayed on the semi-transmissive display 220 of the glasses display device 100 is described. FIG. 20(*a*) is a diagram for describing an example of the field of view of the semi-transmissive display 220, and FIG. 20(*b*) is a diagram for describing an example of the view of the semi-transparent display 220

As illustrated in FIG. 20, in the present embodiment, the view that can be visually recognized on the glasses display device 100 includes a plurality of views 701 to 707. All the plurality of views are segments each constituting part of an integrated continuous image. Through smooth transition from one visually recognized portion to another visually recognized portion in the continuous image, the plurality of views are switchingly displayed without any discontinuity.

As illustrated in FIG. 20, the views 703, 702, 701, 704, and 705 are provided in the top-bottom direction, and the views 706 and 707 are respectively provided on the right side and the left side of the view 701. Note that, as a matter of course, the views 701 to 707 can be freely deleted or changed by the user, and other views can be further added by the user.

Note that, although the views 701 to 707 are a seamless continuous image in the present embodiment, the views to be switched may be discontinuous images independent of one another.

Specifically, in the case where the posture of the glasses display device 100 is in the horizontal direction, that is, in the case where the glasses display device 100 is attached to the user and where the user faces horizontally forward, the view 701 is displayed.

Subsequently, in the case where the glasses display device 100 is attached to the user and where the user faces obliquely upward at about 30 degrees with respect to a horizontal plane (that is, a plane parallel to the horizontal direction), the view 702 is displayed. That is, on the basis of a signal from at least one of the gyroscope unit 420 and the acceleration detection unit 430 in the glasses display device 100, which direction the user faces is recognized. Note that, for example, a screen of a face recognition application may be displayed as the view 702.

Further, in the case where the user faces obliquely upward at about 45 degrees with respect to the horizontal plane, the view 703 is displayed. Weather forecast may be displayed as the view 703. Moreover, other sky information may be displayed as the view 703, and, for example, a constellation image may also be displayed thereas depending on the time zone.

Similarly, in the case where the glasses display device 100 is attached to the user and where the user faces obliquely downward at about 30 degrees with respect to the horizontal plane, the view 704 (for example, an e-mail screen) is displayed. In the case where the user faces obliquely downward at about 45 degrees with respect to the horizontal plane, the view 705 (for example, a map) is displayed. In the case where the user faces rightward at about 30 degrees with respect to a vertical plane, the view 706 (for example, an Internet browser) is displayed. In the case where the user faces leftward at about 30 degrees with respect to the vertical plane, the view 707 (for example, a phone call screen) is displayed.

Moreover, although the switching among the view 701 to the view 707 is made on the basis of the signal from at least one of the gyroscope unit 420 and the acceleration detection unit 430 in the above description, not limited thereto, the switching thereamong may be made on the basis of the above-mentioned finger, palm, or arm recognition.

Further, when the user is walking, as a condition for making at least any of switches from the view 701 to the view 702, from the view 701 to the view 704, from the view 701 to the view 707, and from the view 701 to the view 706, the level of the signal from at least one of the gyroscope unit 420 and the acceleration detection unit 430 may be set to be higher. This can prevent switching from the view 701 to another view in a short time during the walk. Moreover, such setting that switching is not particularly made when the user suddenly turns around may be provided.

Meanwhile, the view 703 of sky information and the view 705 of map information may be panoramically displayed. In this case, the views 703 and 705 may be scrolled along with rightward and leftward movements.

(Event Generation)

Figure 21:
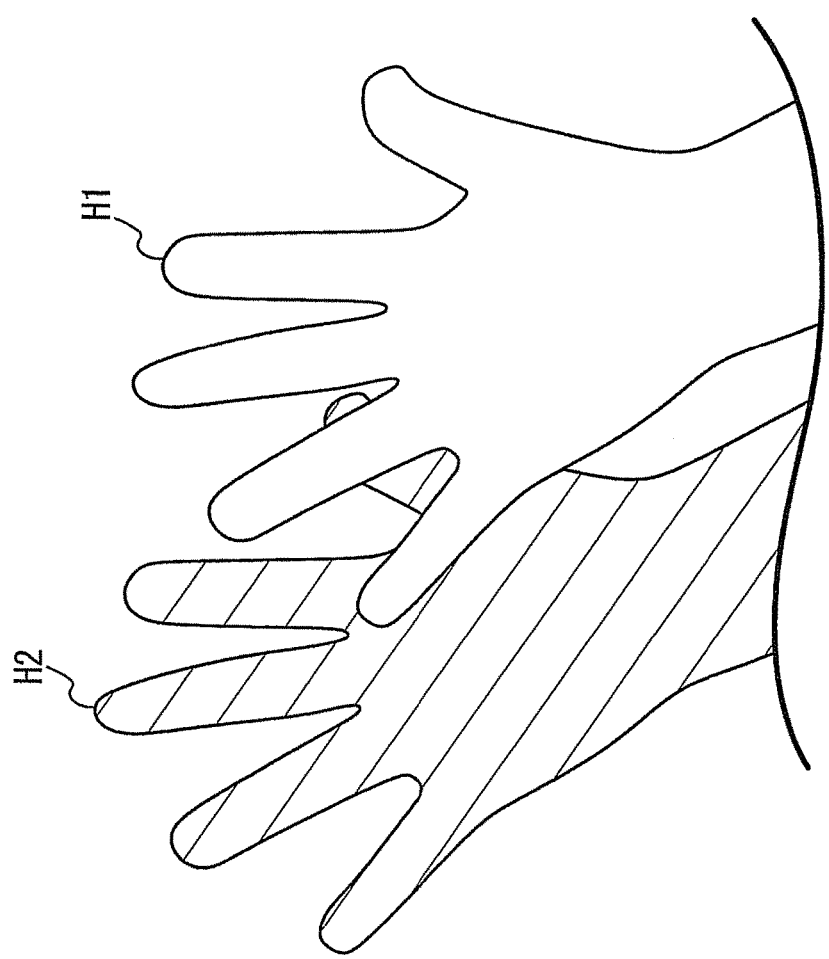
FIG. 21 is a schematic diagram illustrating an example of event generation.

Next, a predetermined event is generated in order to enable the user to easily recognize a difference between the case where the fingers, the palm, the hand, and the arm exist in the manipulation region 410c and the case where the fingers, the palm, the hand, and the arm exist in the gesture region 410g. Hereinafter, the predetermined event is described. FIG. 21 is a schematic diagram illustrating an example of the predetermined event generation, FIG. 22 is a schematic diagram illustrating another example of the event generation in FIG. 21, and FIG. 23 is a schematic diagram illustrating an example of another event generation.

First, as illustrated in FIG. 21, the shape of a hand H1 detected by the infrared ray detection unit 410 is displayed as a virtual image. Further, in the case where the user's hand is far from the manipulation region 410c, a shadow H2 having the shape of the hand H1 is displayed as an example of the event.

This enables the user to easily recognize that his/her hand exists in the gesture region 410g.

Figure 22:
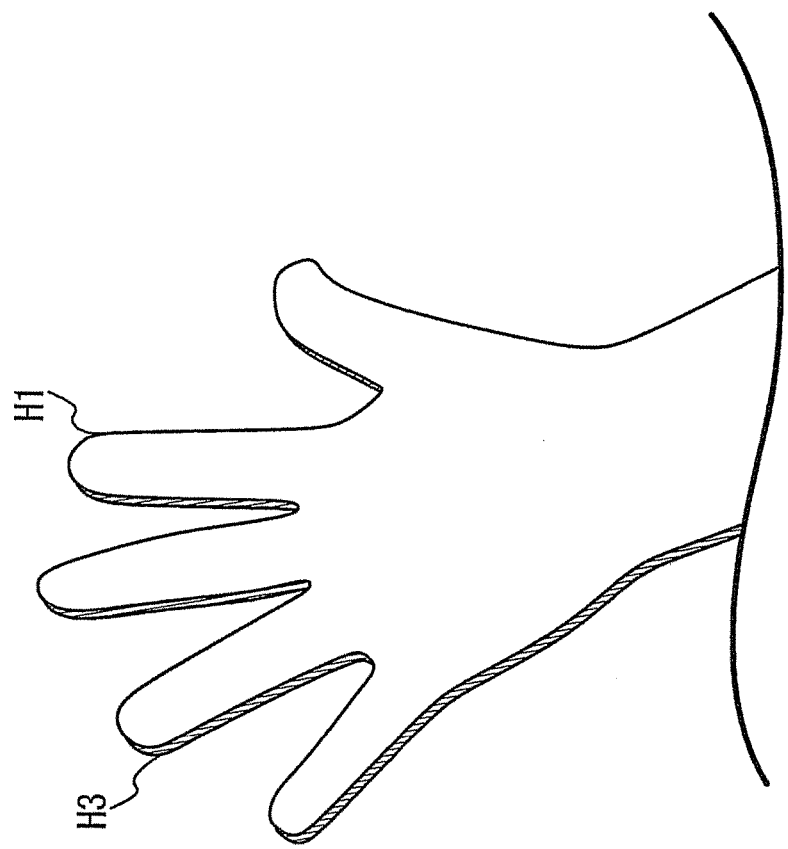
FIG. 22 is a schematic diagram illustrating another example of the event generation.
Figure 23:
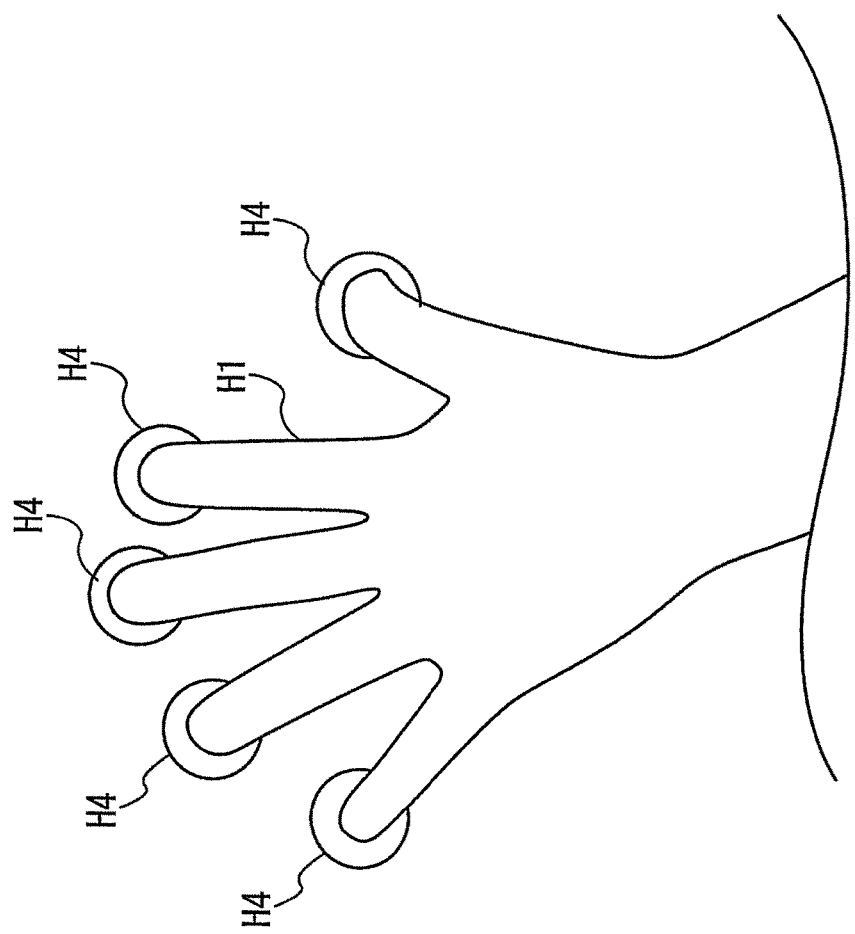
FIG. 23 is a schematic diagram illustrating another example of the event generation.

Subsequently, as illustrated in FIG. 22, the shape of the hand H1 detected by the infrared ray detection unit 410 is displayed as a virtual image, and a shadow H3 darker than the shadow H2 is displayed with a small area around the shape of the hand H1. Accordingly, the user can easily recognize that his/her hand more approaches the manipulation region 410c than the case of FIG. 21. Further, in the case where his/her hand exists in the manipulation region 410c, the shadows H2 and H3 are not displayed.

As a result, the user does not need to look for the manipulation region 410c through trial and error or gropingly. That is, the user can easily recognize the distance to the manipulation region 410c on the basis of the darkness of the shadow and the positional difference between the shape of the hand and the shadow.

Moreover, as illustrated in FIG. 23, in the case where the user's hand exists in the manipulation region 410c, circle views H4 may be respectively displayed on the finger tips.

Note that, although the event generation mode of displaying the shadows H2 and H3 and the circle views H4 is described above in the embodiment, not limited thereto, in the case where the user's hand exists in the manipulation region 410c, the displayed image may be rippled, the glasses display device 100 may be provided with a vibration generation device to generate vibrations, a sound may be generated, and the displayed image may be changed by at least any of blinking the displayed image and changing the lighting luminance. For example, the distance to the manipulation region 410c may be represented by the blinking interval, and the distance to the manipulation region 410c may be represented by the lighting luminance. For example, the blinking interval becomes longer with the increasing distance from the manipulation region 410c, and the blinking interval becomes shorter with the decreasing distance therefrom. Alternatively, the lighting luminance becomes lower with the increasing distance from the manipulation region 410c, and the lighting luminance becomes higher with the decreasing distance therefrom. Alternatively, the displayed image is lighted with a darker color (such as red, black, and purple) with the increasing distance from the manipulation region 410c, and the displayed image is lighted with a paler color (such as blue, yellow, and pink) with the decreasing distance therefrom. In this way, an arbitrary event that appeals to human senses (typified by a sense of sight, a sense of hearing, and a sense of touch) may be generated.

(Manipulation on Glasses Display Device)

A usage mode of the glasses display device 100 along with the above-mentioned finger, palm, and arm recognition and the above-mentioned event generation is described.

First, if the user places his/her hand in the manipulation region 410c, his/her hand is recognized, and the user can manipulate a virtual image view. For example, the user can enlarge or reduce the virtual image view, scroll the view, or select a point.

Figure 24:
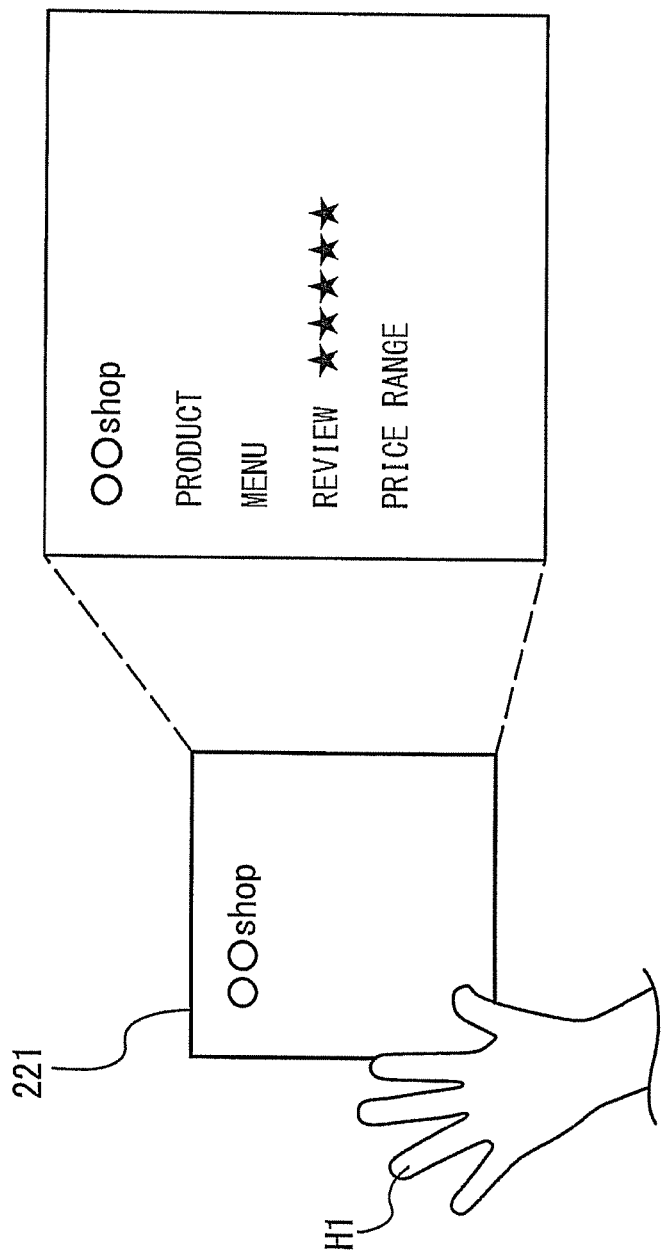
FIG. 24 is a schematic diagram illustrating an example of a manipulation on the glasses display device.

For example, as illustrated in FIG. 24, in the case where the user touches the view of the advertisement 221, an additional view may be displayed.

For example, information on products, services, and the like of a shop is displayed as the advertisement 221. In the case where the user touches the advertisement 221, further detailed information concerning the shop may be additionally displayed. For example, in the case where the shop is a restaurant, a main menu, user's reviews, a price range, and the like of the restaurant may be displayed.

Note that the advertisement 221 may be an image itself obtained by taking the shop by the camera unit 303, and may be recognition result information that is displayed on a shop recognition application screen as a result of automatically starting shop recognition on the basis of the image data of the shop taken by the camera unit 303.

(Display Based on Parody Mode)

Figure 25:
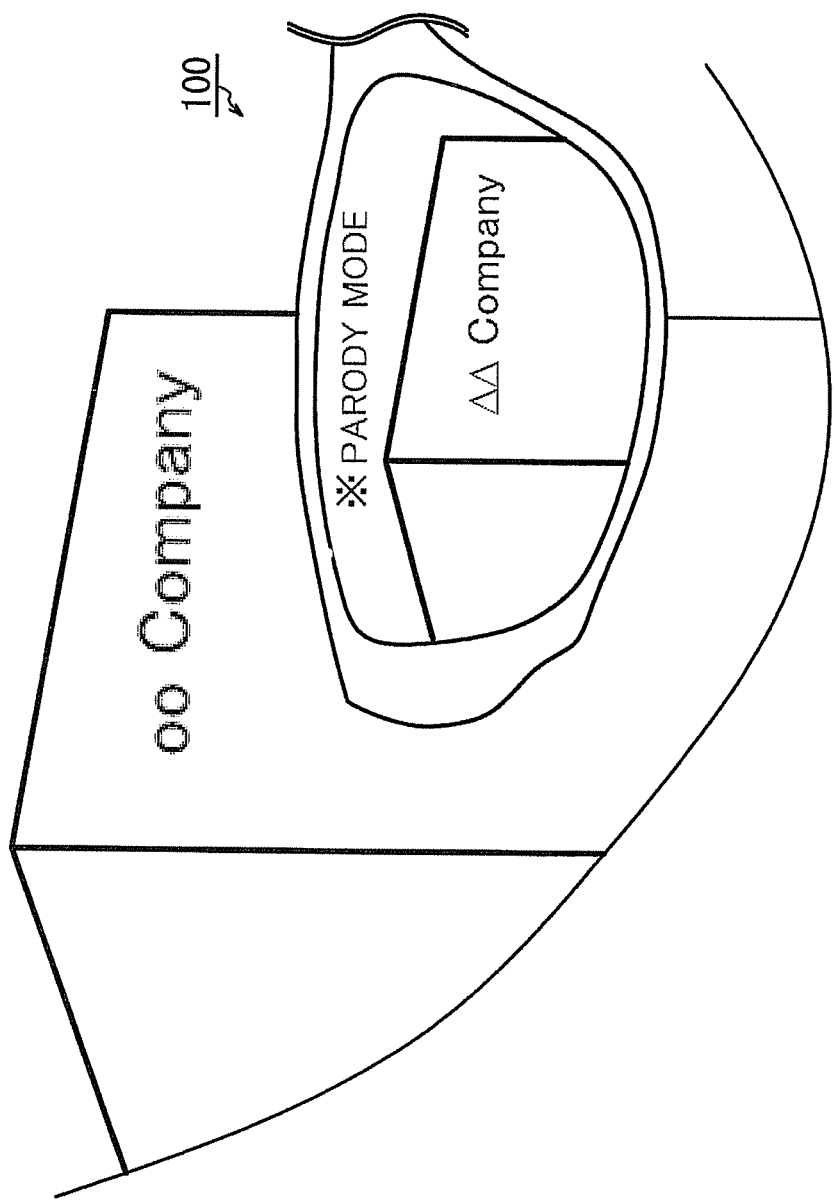
FIG. 25 is a schematic diagram illustrating another example of the manipulation on the glasses display device.

Moreover, as illustrated in FIG. 25, when a logo of one company (∘∘ Company) is displayed on the semi-transmissive display 220, if the user touches the logo on the screen, information concerning another competitive or non-competitive company (ΔΔ Company) can be displayed. In this case, for example, a logo of the another company may be displayed as a parody mode.

(Display Based on Gesture Recognition)

Moreover, if the user makes a predetermined hand pose within the gesture region 410g, a preset operation is carried out. FIG. 26 to FIG. 33 are schematic diagrams each illustrating an example of the gesture recognition.

Figure 26:
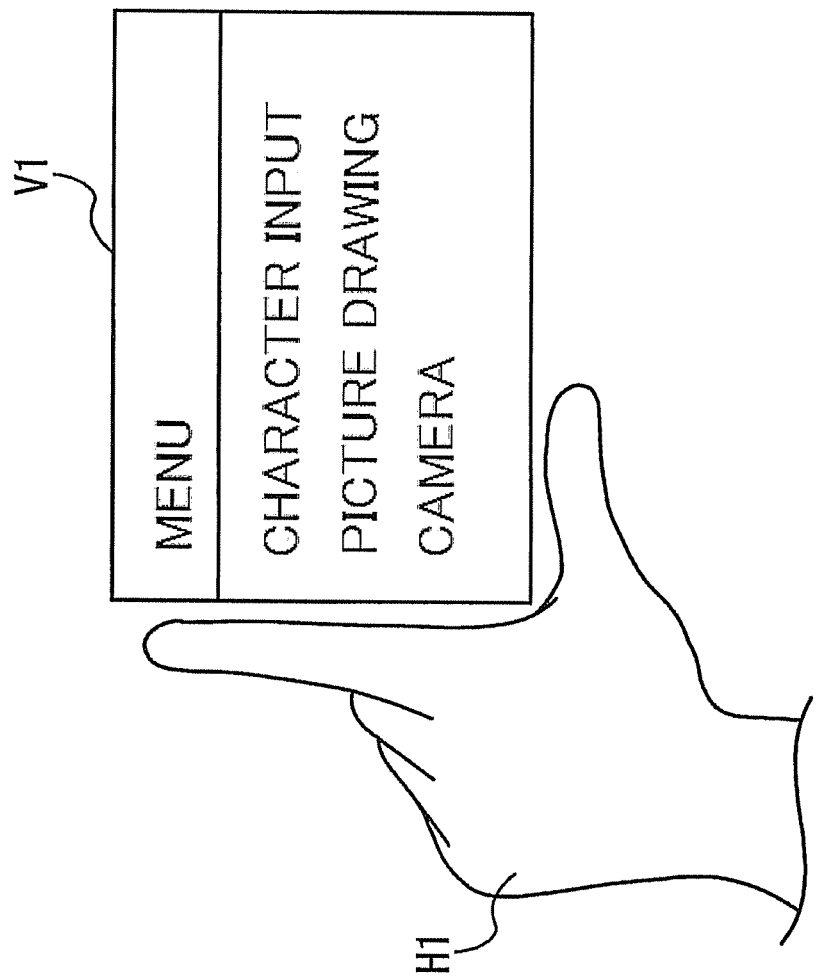
FIG. 26 is a schematic diagram illustrating an example of gesture recognition.

For example, as illustrated in FIG. 26, in the case where the user opens and stretches the thumb and the index finger of the closed hand H1 at 90 degrees to make an L-shaped sign, a menu screen V1 may be displayed between the thumb and the index finger.

Figure 27:
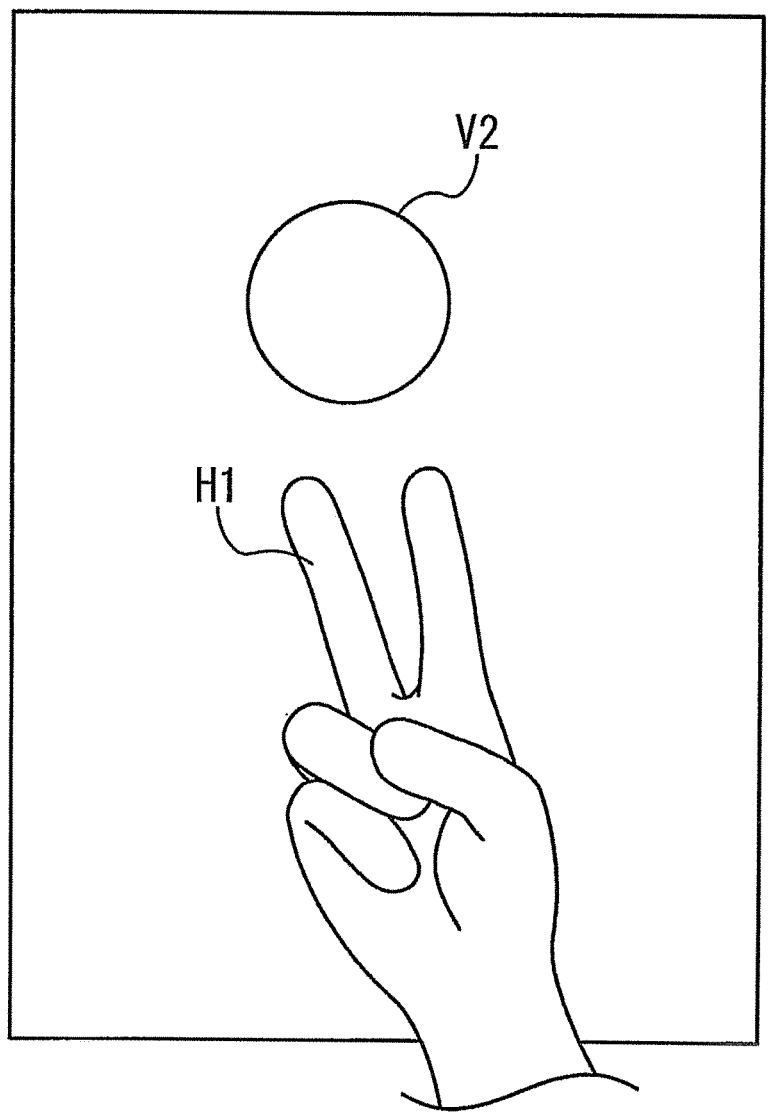
FIG. 27 is a schematic diagram illustrating another example of the gesture recognition.

Moreover, as illustrated in FIG. 27, in the case where the user opens and stretches the index finger and the middle finger of the closed hand H1 to make a so-called peace sign, a predetermined image V2 may be displayed between the index finger and the middle finger.

Figure 28:
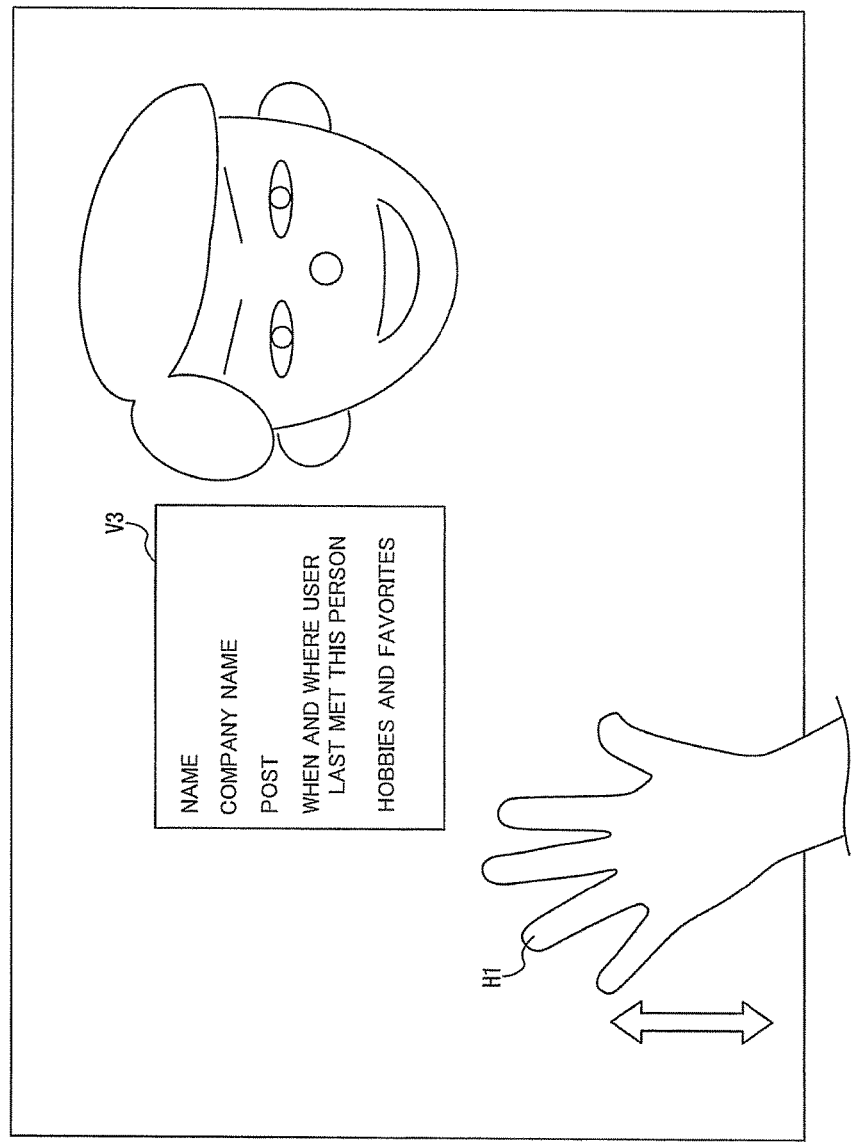
FIG. 28 is a schematic diagram illustrating another example of the gesture recognition.

Moreover, as illustrated in FIG. 28, in the case where the user makes a greeting action by moving the loosely opened hand H1 in an arrow direction, a face recognition application is automatically activated. On the basis of face data acquired by the camera unit 303, of a person whom the user gives the greeting, the face recognition is automatically started, and information on the name, the company name, the post, when and where the user last met this person, and the like is displayed on a face recognition application screen V3. Further, a flag is set each time the user meets the same person based on the recognition of the face recognition application, and the number of flags may be displayed on the face recognition application screen V3. In this case, the background, color, and the like of the face recognition application screen V3 may be changed depending on the number of flags.

Figure 29:
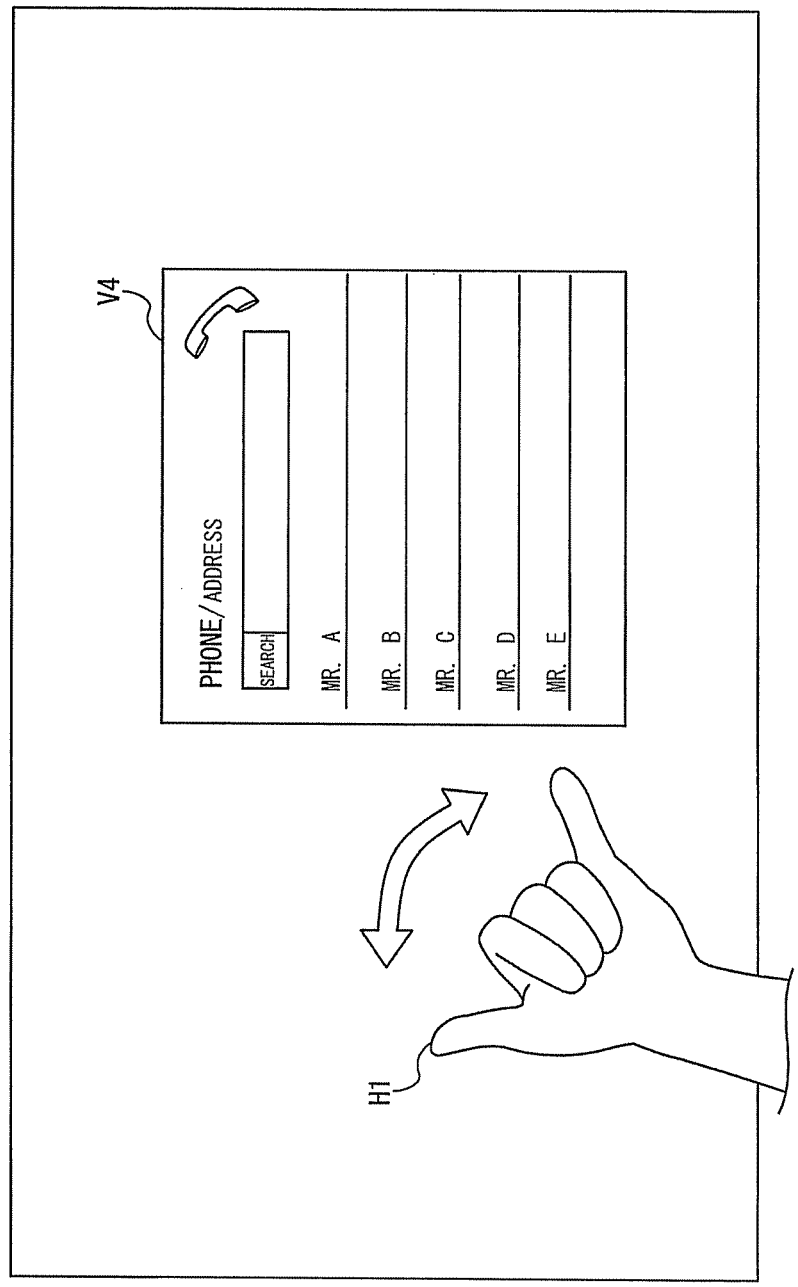
FIG. 29 is a schematic diagram illustrating another example of the gesture recognition.

Further, as illustrated in FIG. 29, in the case where the user opens the thumb and the little finger of the closed hand H1 to make a so-called aloha sign and waves the sign in the arrow directions, a phone application is automatically activated, and address book data V4 is displayed. The user can make a phone call to a predetermined person by manipulating the phone application.

Figure 30:
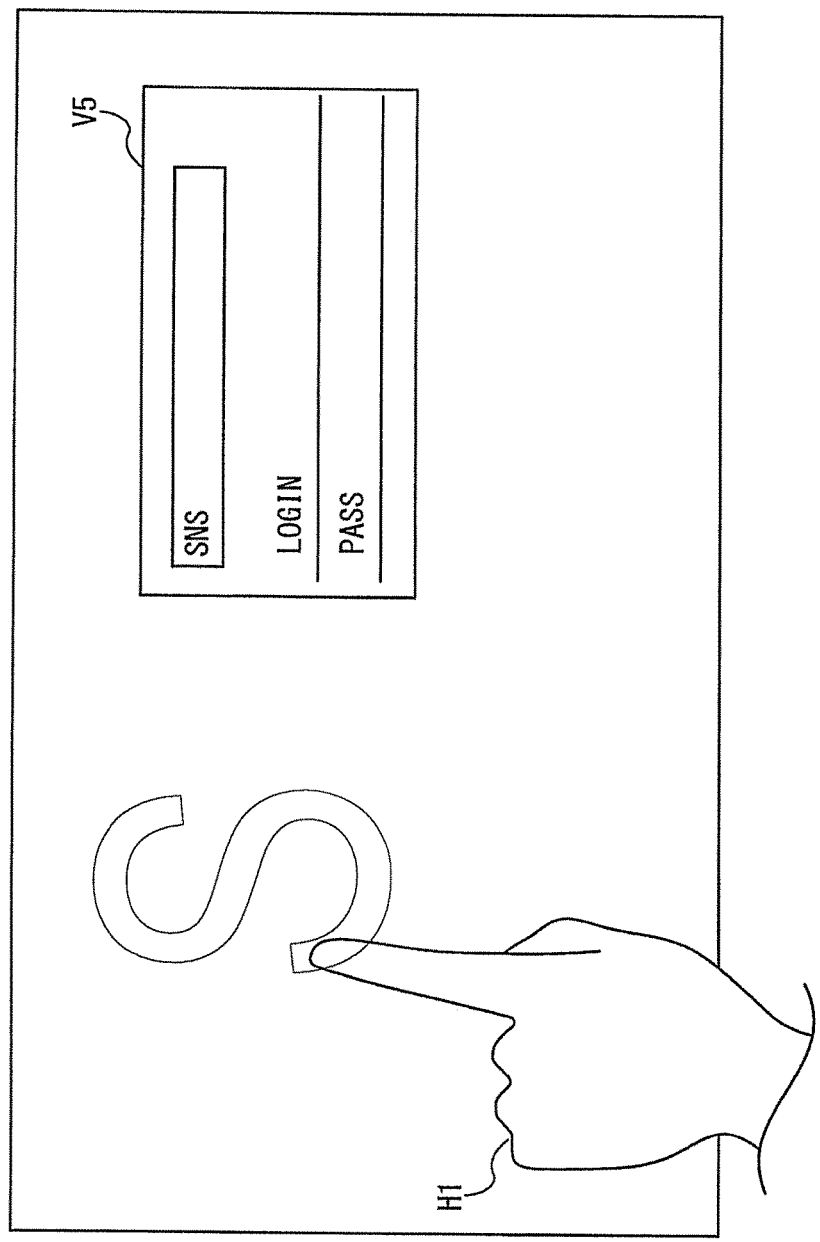
FIG. 30 is a schematic diagram illustrating another example of the gesture recognition.

Moreover, as illustrated in FIG. 30, in the case where the user draws an alphabetical letter S with a finger of the hand H1, a social networking service (SNS) application is automatically activated, and a SNS application screen V5 can be displayed.

Figure 31:
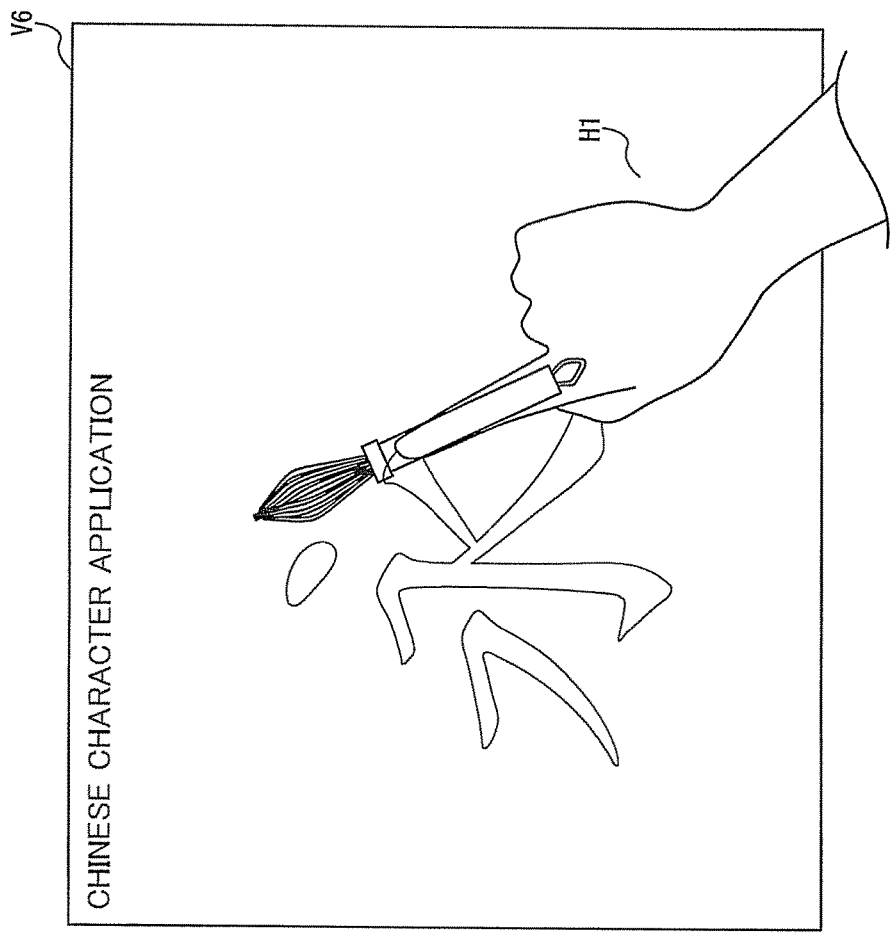
FIG. 31 is a schematic diagram illustrating another example of the gesture recognition.

Further, as illustrated in FIG. 31, in the case where the user activates a Chinese character application and causes the application to recognize the index finger of the hand H1, an image of an ink brush is further additionally displayed at the position of the index finger, and the user can practice writing Chinese characters on a Chinese character practice application screen V6.

Figure 32:
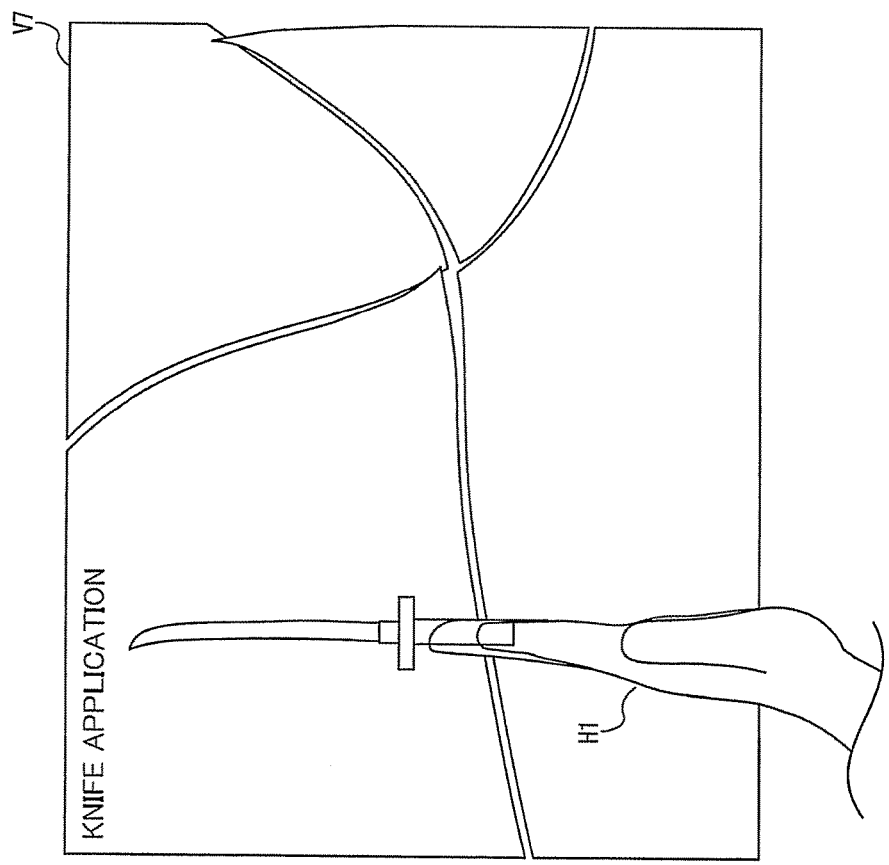
FIG. 32 is a schematic diagram illustrating another example of the gesture recognition.

Moreover, as illustrated in FIG. 32, in the case where the user makes the hand H1 into a hand-knife shape, a knife application is activated, an image of a knife is further additionally displayed at the position of the knife-shaped hand, and the user can cut a virtual image display screen V7.

Figure 33:
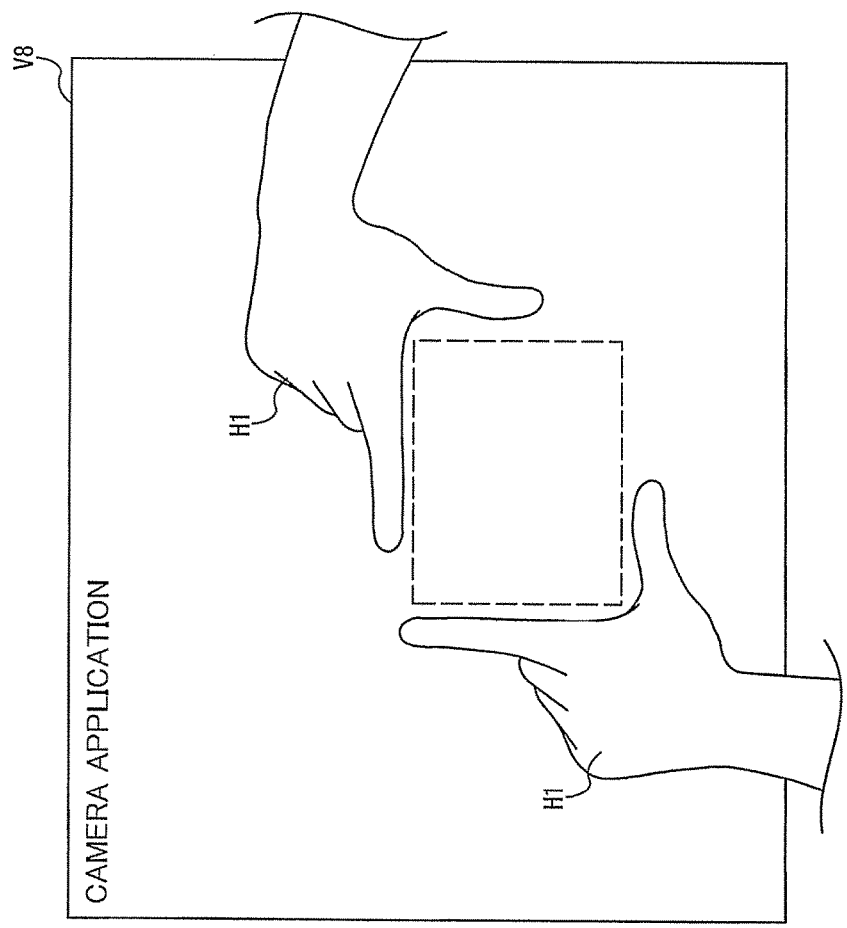
FIG. 33 is a schematic diagram illustrating another example of the gesture recognition.

Moreover, as illustrated in FIG. 33, in the case where the user forms a quadrangle with fingers of both the hands H1, a camera application is automatically activated, and an image of scenery or the like within an image taking frame extracted from the formed quadrangle may be taken on a camera application screen V8.

As described above, the glasses display device 100 according to the present invention generates an event according to the mode of the hand H1 at least either in the virtual image display region 2203D or in the three-dimensional space detection region 4103D so that it is possible to add a sense of distance from the position of visually recognizing eyes to a stereoscopic image that is a virtual image, through the hand H1 that is a real image and provide visual recognition as if the stereoscopic image were associated with the hand H1.

According to the glasses display device 100, the event service unit 460 can display the shadows H2 and H3 of the hand H1 in the three-dimensional space detection region 4103D so that it is possible to add higher reality to the visual recognition mode as if the stereoscopic image that is a virtual image were associated with the hand H1 that is a real image.

According to the glasses display device 100, the shadows H2 and H3 of the hand H1 can be changed according to the motion of the hand H1 in the depth level direction so that the sense of distance between the stereoscopic image and the hand H1 can be easily grasped. More specifically, the sense of distance between the hand H1 and the common region of the virtual image display region 2203D and the three-dimensional space detection region 4103D can be easily recognized by change from the shadow H2 to the shadow H3.

According to the glasses display device 100, the event service unit 460 can display the circle view H4 at a position surrounding the tip of the hand H1 in the common region of the virtual image display region 2203D and the three-dimensional space detection region 4103D so that whether or not the fingers of the hand H1 exist in the common region can be easily recognized.

The glasses display device 100 is achieved in a small-sized and attachable mode so that the glasses display device 100 can be easily carried. Furthermore, since the glasses display device 100 is small, the versatility and convenience can be enhanced.

In the present invention, the semi-transmissive display 220 corresponds to the "display device", the hand H1 corresponds to the "object", the infrared ray detection unit 410 corresponds to the "depth level sensor", the virtual image display region 2203D corresponds to the "stereoscopic image", the three-dimensional space detection region 4103D corresponds to the "depth level detection region", the event service unit 460 corresponds to the "event generating unit", the glasses display device 100 corresponds to the "I/O device", and the shadows H2 and H3 correspond to the "shadow".

A preferred embodiment of the present invention has been described hereinabove, but the present invention is not limited to only the embodiment. It should be understood that various other embodiments are possible without departing from the spirit and scope of the present invention. Further, operations and effects produced by the configuration of the present invention are described in the present embodiment, but these operations and effects are given as examples, and are not intended to limit the present invention.

FIG. 4
S1 PERFORM DEPTH COMPUTING
S2 PROCESS TAKEN IMAGE DATA
S3 RECOGNIZE OUTER SHAPE
S4 RECOGNIZE GESTURE
S5 CARRY OUT EVENT
S6 VIRTUALLY DISPLAY IMAGE
FIG. 14
S11 RECOGNIZE MAXIMUM REGION
S12 DETERMINE DISPLAY POSITION OF VIRTUAL IMAGE DISPLAY REGION
S13 SET MAXIMUM REGION OF GESTURE REGION
S14 PERFORM ROUNDING PROCESS
S15 DISPLAY RECTANGULAR IMAGE
S16 DISPLAY INSTRUCTION TO USER
S17 AUTOMATICALLY ADJUST CORRELATION
FIG. 16
S21 PERFORM DEVICE INITIALIZATION
S22 DETECT BY INFRARED RAY CAMERA
S23 REPLACE WITH DISTANCE
S24 CREATE DEPTH MAP

S25 BINARIZE IMAGE DATA
S26 CREATE POLYGON
S27 EXTRACT OUTER SHAPE
S28 CREATE CONVEX HULL
S29 CALCULATE TIP POINT
S30 CALCULATE BASE POINT
S31 EXTRACT SKELETON
S32 COMPARE WITH PREVIOUS SEVERAL FRAMES
S3.3 DELIVER EVENT
S34 BEHAVE IN ACCORDANCE WITH EVENT
S35 REQUEST DRAWING
S36 CORRECT DISPLAYED IMAGE
S37 PERFORM DISPLAY PROCESS
FIG. 20
1 FACE RECOGNITION
FIG. 24
1 PRODUCT
2 MENU
3 REVIEW
4 PRICE RANGE
FIG. 25
1 oo Company
2 PARODY MODE
3 ΔΔ Company
FIG. 26
1 MENU
2 CHARACTER INPUT
3 PICTURE DRAWING
4 CAMERA
FIG. 28
1 NAME
2 COMPANY NAME
3 POST
4 WHEN AND WHERE USER LAST MET THIS PERSON
5 HOBBIES AND FAVORITES
FIG. 29
1 ADDRESS
2 SEARCH
3 MR. A
4 MR. B
5 MR. C
6 MR. D
7 MR. E
FIG. 31
1 CHINESE CHARACTER APPLICATION
FIG. 32
1 KNIFE APPLICATION
FIG. 33
1 CAMERA APPLICATION

The invention claimed is:

1. An input/output (I/O) device comprising:
a display device that can generate a stereoscopic image in a virtual image display region;
a depth level sensor that measures a distance to an object in a three-dimensional space detection region; and
a control unit that comprises a memory and a processor and performs functions including:
a depth map processing function that sets an overlapping space region of the three-dimensional space detection region, the virtual image display region and an arm movement region in which both hands can move horizontally and vertically with joints of both shoulders being a center of rotation as a manipulation region, and sets a portion other than the manipulation region in the three-dimensional space detection region as a gesture region;
a gesture recognition function that recognizes a gesture of the hands in the gesture region; and
a graphics processing function that manipulates the stereoscopic image based on an output of the depth level sensor in the manipulation region or based on the gesture recognized in the gesture region; and
a calibration processing function that determines display position of the virtual image display region and adjusts automatically correlation of the three-dimensional space detection region and the virtual image display region.

2. The I/O device according to claim 1, the control unit further performing:
an event service function that carries out a predetermined event in accordance with the gesture recognized by the gesture recognition function.

3. The I/O device according to claim 2, wherein the predetermined event is displaying a shadow of the hand and changing the shadow of the hand according to a motion of the hand in a depth level direction.

4. The I/O device according to claim 1, wherein the display device is a head-mount display device.

5. An input/output (I/O) system comprising:
a memory to store computer executable instructions, and
a processor that executes the computer executable instructions to perform processes, comprising:
a display process of generating a stereoscopic image in a virtual image display region;
a depth level sensor process of measuring a distance to an object in a three-dimensional space detection region;
a depth map process of setting an overlapping space region of the three-dimensional space detection region, the virtual image display region and an arm movement region in which both hands can move horizontally and vertically with joints of both shoulders being a center of rotation as a manipulation region, and setting a portion other than the manipulation region in the three-dimensional space detection region as a gesture region;
a gesture recognition process of recognizing a gesture of the hands in the gesture region;
a graphics process of manipulating the stereoscopic image based on an output of the depth level sensor in the manipulation region or based on the gesture recognized in the gesture region; and
a calibration process of determining display position of the virtual image display region and automatically adjusting correlation of the three-dimensional space detection region and the virtual image display region.

6. The I/O system according to claim 5, further comprising:
an event service process of carrying out a predetermined event in accordance with the gesture recognized in the gesture recognition process.

7. The I/O system according to claim 6, wherein the predetermined event is displaying a shadow of the hand and changing the shadow of the hand according to a motion of the hand in a depth level direction.

8. An input/output (I/O) method comprising:
a display step of generating a stereoscopic image in a virtual image display region;
a depth level sensor step of measuring a distance to an object in a three-dimensional space detection region;
a depth map processing step of setting an overlapping space region of the three-dimensional space detection region, the virtual image display region and an arm movement region in which both hands can move horizontally and vertically with joints of both shoulders being a center of rotation as a manipulation region, and setting a portion other than the manipulation region in the three-dimensional space detection region as a gesture region;

a gesture recognition step of recognizing a gesture of the hands in the gesture region;

a graphics processing step of manipulating the stereoscopic image based on an output of the depth level sensor in the manipulation region or based on the gesture recognized in the gesture region; and a calibration processing step of determining display position of the virtual image display region and automatically adjusting correlation of the three-dimensional space detection region and the virtual image display region.

9. The I/O method according to claim 8, further comprising:

an event service step of carrying out a predetermined event in accordance with the gesture recognized in the gesture recognition step.

10. The I/O method according to claim 9, wherein the predetermined event is displaying a shadow of the hand and changing the shadow of the hand according to a motion of the hand in a depth level direction.

* * * * *